(12) United States Patent
Thompson et al.

(10) Patent No.: US 11,627,294 B2
(45) Date of Patent: Apr. 11, 2023

(54) SYSTEM AND METHOD FOR DISPLAYING LOCATION DEPENDENT CONTENT

(71) Applicant: Misapplied Sciences, Inc., Redmond, WA (US)

(72) Inventors: David Steven Thompson, Redmond, WA (US); Paul Henry Dietz, Redmond, WA (US); Albert Han Ng, Redmond, WA (US)

(73) Assignee: Misapplied Sciences, Inc., Pasadena, CA (US)

( * ) Notice: Subject to any disclaimer, the term of this patent is extended or adjusted under 35 U.S.C. 154(b) by 0 days.

(21) Appl. No.: 16/448,549

(22) Filed: Jun. 21, 2019

(65) Prior Publication Data
US 2019/0313069 A1    Oct. 10, 2019

Related U.S. Application Data

(63) Continuation of application No. 15/060,527, filed on Mar. 3, 2016, now Pat. No. 10,362,284.
(Continued)

(51) Int. Cl.
*H04N 9/31* (2006.01)
*H04N 13/373* (2018.01)
(Continued)

(52) U.S. Cl.
CPC ......... *H04N 9/3185* (2013.01); *H04N 13/349* (2018.05); *H04N 13/373* (2018.05); *H04N 13/376* (2018.05); *H04N 2013/403* (2018.05)

(58) Field of Classification Search
CPC .. H04N 9/3185; H04N 13/349; H04N 13/373; H04N 13/376; H04N 2013/403
See application file for complete search history.

(56) References Cited

U.S. PATENT DOCUMENTS

| 5,855,425 A | 1/1999 | Hamagishi |
|---|---|---|
| 6,339,421 B1 | 1/2002 | Puckeridge |

(Continued)

FOREIGN PATENT DOCUMENTS

| EP | 2685735 A1 | 1/2014 |
|---|---|---|
| JP | 2004-078125 | 3/2004 |

(Continued)

OTHER PUBLICATIONS

English Translation of Chinese Office Action dated Oct. 8, 2019 in Chinese Patent Application No. 2016800127601.
(Continued)

*Primary Examiner* — John W Miller
*Assistant Examiner* — Sean N. Haiem
(74) *Attorney, Agent, or Firm* — Kaplan Breyer Schwarz, LLP

(57) ABSTRACT

A system and method for simultaneously displaying, in plural spatially distinct zones via a multi-view display, differentiated content is disclosed. In accordance with the method, a plurality of spatially distinct zones are defined, differentiated content is assigned to the zones, a location for at least some of plural landing spots of beamlets projected by multi-view pixels of the multi-view display is estimated, the spatially distinct zone in which each said landing spots resides is determined, and beamlets associated with said some landing spots are driven to cause an appropriate content portion to be viewable at said some landing spots, as a function of location in a particular spatially distinct zone.

18 Claims, 12 Drawing Sheets

Related U.S. Application Data

(60) Provisional application No. 62/127,434, filed on Mar. 3, 2015.

(51) Int. Cl.
*H04N 13/376* (2018.01)
*H04N 13/349* (2018.01)
*H04N 13/30* (2018.01)

(56) References Cited

U.S. PATENT DOCUMENTS

| | | | |
|---|---|---|---|
| 6,377,295 | B1 | 4/2002 | Woodgate et al. |
| 7,001,023 | B2 | 2/2006 | Lee et al. |
| 7,602,395 | B1 | 10/2009 | Diard |
| 7,990,498 | B2 | 8/2011 | Hong |
| 8,461,995 | B1 | 6/2013 | Thornton |
| 9,080,219 | B2 | 7/2015 | Chang et al. |
| 9,080,279 | B2 | 7/2015 | Jun et al. |
| 9,715,827 | B2 | 7/2017 | Ng et al. |
| 9,743,500 | B2 | 8/2017 | Dietz et al. |
| 9,792,712 | B2 | 10/2017 | Ng et al. |
| 2003/0115096 | A1 | 6/2003 | Reynolds et al. |
| 2003/0156260 | A1 | 8/2003 | Putilin et al. |
| 2004/0051644 | A1 | 3/2004 | Tamayama et al. |
| 2005/0195330 | A1 | 9/2005 | Zacks et al. |
| 2007/0040892 | A1 | 2/2007 | Aoki et al. |
| 2009/0273486 | A1 | 11/2009 | Sitbon |
| 2010/0085517 | A1 | 4/2010 | Hong |
| 2010/0207961 | A1 | 8/2010 | Zomet |
| 2010/0214537 | A1 | 8/2010 | Thomas |
| 2011/0159929 | A1 | 6/2011 | Karaoguz et al. |
| 2011/0216171 | A1 | 9/2011 | Barre et al. |
| 2011/0242298 | A1 | 10/2011 | Bathiche et al. |
| 2011/0304613 | A1 | 12/2011 | Thoresson |
| 2011/0310003 | A1* | 12/2011 | de la Barre .......... H04N 13/302 345/156 |
| 2012/0026157 | A1 | 2/2012 | Unkel et al. |
| 2012/0062565 | A1 | 3/2012 | Fuchs et al. |
| 2012/0105445 | A1 | 5/2012 | Sakai et al. |
| 2012/0140048 | A1 | 6/2012 | Levine |
| 2012/0218253 | A1 | 8/2012 | Clavin |
| 2013/0093752 | A1* | 4/2013 | Yuan ................... H04N 13/349 345/419 |
| 2013/0114019 | A1 | 5/2013 | Ijzerman et al. |
| 2013/0169765 | A1 | 7/2013 | Park et al. |
| 2013/0321599 | A1 | 12/2013 | Harrold et al. |
| 2014/0015829 | A1 | 1/2014 | Park et al. |
| 2014/0035877 | A1 | 2/2014 | Cai et al. |
| 2014/0111101 | A1 | 4/2014 | McRae |
| 2014/0118403 | A1 | 5/2014 | Verthein et al. |
| 2014/0310271 | A1 | 10/2014 | Song et al. |
| 2015/0020135 | A1 | 1/2015 | Frusina et al. |
| 2015/0042771 | A1 | 2/2015 | Jensen et al. |
| 2015/0049176 | A1 | 2/2015 | Hinnen et al. |
| 2015/0062314 | A1* | 3/2015 | Itoh ...................... H04N 13/239 348/55 |
| 2015/0085091 | A1 | 3/2015 | Varekamp |
| 2015/0092026 | A1 | 4/2015 | Baik et al. |
| 2015/0154394 | A1 | 6/2015 | Kapinos et al. |
| 2015/0198940 | A1 | 7/2015 | Hwang et al. |
| 2015/0279321 | A1 | 10/2015 | Falconer et al. |
| 2015/0334807 | A1 | 11/2015 | Gordin et al. |
| 2015/0365422 | A1 | 12/2015 | Peterson et al. |
| 2016/0012726 | A1 | 1/2016 | Wang |
| 2016/0027029 | A1 | 1/2016 | Poole |
| 2016/0210100 | A1 | 7/2016 | Ng et al. |
| 2016/0212417 | A1 | 7/2016 | Ng et al. |
| 2016/0224122 | A1 | 8/2016 | Dietz et al. |
| 2016/0227200 | A1 | 8/2016 | Reitterer et al. |
| 2016/0227201 | A1 | 8/2016 | Ng et al. |
| 2016/0261837 | A1 | 9/2016 | Thompson et al. |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0366749 | A1 | 12/2016 | Dietz et al. |
| 2016/0371866 | A1 | 12/2016 | Ng et al. |
| 2017/0124204 | A1 | 5/2017 | Gossweiler et al. |
| 2017/0205889 | A1 | 7/2017 | Ng et al. |

FOREIGN PATENT DOCUMENTS

| | | |
|---|---|---|
| JP | 2012-010086 | 1/2010 |
| JP | 2012-042507 | 3/2012 |
| JP | 2014-178366 | 9/2014 |
| WO | 02/24470 A1 | 3/2002 |
| WO | 2013/183108 A1 | 12/2013 |

OTHER PUBLICATIONS

English Translation of Office Action dated Dec. 3, 2019 in Japanese Patent Application No. 2017-546647.
Office Action issued in European patent application No. 16714615.8, dated Aug. 9, 2019, 5 pp.
"Non-Final Office Action", dated Jan. 26, 2017, issued in U.S. Appl. No. 15/088,912.
"Non-Final Office Action", dated Mar. 24, 2017, Issued in related U.S. Appl. No. 15/002,175, 26 pp.
"Non-Final Office Action", Related U.S. Appl. No. 15/015,099, dated May 4, 2017, 9 pp.
"Non-Final Office Action", Related U.S. Appl. No. 15/184,874, dated May 22, 2017, 19 pp.
"Non-Final Office Action", U.S. Appl. No. 15/002,158, dated Mar. 3, 2017, p. 19.
"Non-Final Office Action", U.S. Appl. No. 15/060,527, dated May 19, 2017, 13 pp.
"Notice of Allowance and Fees Due", U.S. Appl. No. 15/180,341, dated Jul. 11, 2017, 7 pp.
"Office Action" dated Oct. 6, 2016 in U.S. Appl. No. 15/060,527.
Advisory Action (PTOL-303) received for U.S. Appl. No. 15/002,158, dated Dec. 20, 2018, 4 pages.
Advisory Action (PTOL-303) received for U.S. Appl. No. 15/060,527, dated Jan. 30, 2019, 3 pages.
Advisory Action (PTOL-303) received for U.S. Appl. No. 15/944,366, dated Feb. 20, 2019, 3 pages.
Applicant Initiated Interview Summary received for U.S. Appl. No. 15/002,158, dated Sep. 24, 2018, 4 pages.
Authorized Officer: Jacinta Molloy, "International Search Report and Written Opinion" dated Sep. 29, 2016 in PCT Application No. PCT/US2016/037185.
Authorized Officer: Mehrdad Dastouri, "International Preliminary Report on Patentability" dated Feb. 3, 2017 issued in PCT International Application PCT/US16/14122, 21 pp.
Authorized Officer: Patricia Stein, "International Search Report" dated May 12, 2016, issued in International Patent Application No. PCT/US2016/020784.
"Final Office Action", U.S. Appl. No. 15/002,164, dated Oct. 5, 2017, 27 pp.
"Non-Final Office Action", U.S. Appl. No. 15/002,014, dated Oct. 27, 2017, 11 pp.
Examiner initiated interview summary (PTOL-413B) received for U.S. Appl. No. 15/060,527, dated Jan. 30, 2019, 2 pages.
"Final Office Action", U.S. Appl. No. 15/015,099, dated Nov. 13, 2017, 14 pp.
"Final Office Action", U.S. Appl. No. 15/002,175, dated Nov. 2, 2017, 21 pp.
"Non Final Office Action" dated Apr. 4, 2018 in U.S. Appl. No. 15/002,158, p. 23.
"Non Final Office Action" issued in related U.S. Appl. No. 15/002,158, dated Apr. 4, 2018, 23 pp.
"Non-Final Office Action", dated Mar. 22, 2017, Issued in related U.S. Appl. No. 15/002,164, 28 pp.
"Notice of Allowance", Issued in U.S. Appl. No. 15/184,874, dated Sep. 8, 2017, 14 pp.
"Non-Final Office Action" dated Feb. 8, 2018 in U.S. Appl. No. 15/060,527.

(56) References Cited

OTHER PUBLICATIONS

"Advisory Action" received for U.S. Appl. No. 15/002,175, dated Jun. 21, 2018, 3 pages.
"Non-Final Office Action" in U.S. Appl. No. 15/062,103 dated Feb. 14, 2018.
"Non-Final Office Action" dated Jan. 31, 2017, Issued in U.S. Appl. No. 15/180,341.
Final Office Action received for U.S. Appl. No. 15/002,158 dated Oct. 5, 2018, 22 pages.
Final Office Action received for U.S. Appl. No. 15/060,527 dated Oct. 5, 2018, 14 pages.
Final Rejection received for U.S. Appl. No. 15/002,014, dated Jul. 1, 2019, 12 pages.
Final Rejection received for U.S. Appl. No. 15/944,366, dated Nov. 14, 2018, 26 pages.
Non-Final Office Action received for U.S. Appl. No. 15/015,099 dated Oct. 12, 2018, 6 pages.
Non-Final Office Action received for U.S. Appl. No. 15/062,103 dated Oct. 11, 2018, 9 pages.
Non-Final Rejection dated Oct. 12, 2018 for U.S. Appl. No. 15/015,099.
Non-Final Rejection received for U.S. Appl. No. 15/002,014, dated Jan. 15, 2019, 18 pages.
Non-Final Rejection received for U.S. Appl. No. 15/410,508, dated May 24, 2019, 12 pages.
Notice of Allowance and Fees Due (PTOL-85) received for U.S. Appl. No. 15/015,099, dated Dec. 18, 2018, 5 pages.
Notice of Allowance and Fees Due (PTOL-85) received for U.S. Appl. No. 15/060,527, dated Mar. 14, 2019, 8 pages.
Office Action received for European Application No. 16707570.4, dated Sep. 13, 2018, 6 pages.
Office Action received for European Patent Application No. 16714615.8, dated Aug. 9, 2019, 5 pages.
Office Action received for European Patent Application No. 16714615.8, dated Oct. 10, 2018, 4 pages.
Officer: Jeffrey Harold, "International Preliminary Report on Patentability", Completed Mar. 20, 2017, Issued in International Patent Application PCT/US2016/020784, 6 pp.
Officer: Patricia Stein, "International Search Report and Written Opinion" dated Jun. 3, 2016 in PCT Application PCT/US2016/04122.
Officer: Patricia Stein, "International Search Report and Written Opinion", issued in related PCT Application PCT/US2016/020784, dated May 12, 2016.
Applicant Initiated Interview Summary received for U.S. Appl. No. 15/002,014, dated Dec. 26, 2019, 1 page.
Decision to grant a European patent dated May 28, 2020 for EP Application No. 16707570.
Examination Report issued in related Indian Patent Application No. 201717032395 dated Oct. 20, 2020.
Non-Final Office Action received for U.S. Appl. No. 15/944,366, dated Apr. 9, 2020, 25 pages.
Notice of Allowance received for U.S. Appl. No. 15/002,014, dated Feb. 13, 2020, 9 pages.
Notice of Allowance received for U.S. Appl. No. 15/410,508, dated Dec. 30, 2019, 8 pages.
Office Action received for European Patent Application No. 16714615.8, dated Mar. 23, 2020, 4 pages.
Communication about intention to grant a European patent dated Jan. 18, 2021 for EP Application No. 16732136.3.
Communication about intention to grant a European patent dated Jan. 27, 2020 for EP Application No. 16707570.4.
Communication about intention to grant a European patent dated Oct. 16, 2020 for EP Application No. 16714615.8.
Decision to grant a European patent dated Apr. 9, 2021 for U.S. Appl. No. 16/714,615.
Decision to grant a European patent dated Jul. 8, 2021 for EP Application No. 16732136.3.
Examiner Interview Summary Record (PTOL—413) dated Feb. 1, 2021 for U.S. Appl. No. 15/002,164.
Notice of Allowance and Fees Due (PTOL-85) dated Feb. 1, 2021 for U.S. Appl. No. 15/002,164.
Notice of Allowance and Fees Due (PTOL-85) dated Jan. 13, 2021 for U.S. Appl. No. 15/002,175.
Notice of Allowance dated May 17, 2021 for U.S. Appl. No. 15/002,158.
Office Action issued in Canadian patent application No. 2978717, dated Jan. 26, 2022, 5 pp.
Notice of Rejection issued in Korean patent application No. 10-2017-7027817, dated May 4, 2022, 18 pp. w/ translation.

* cited by examiner

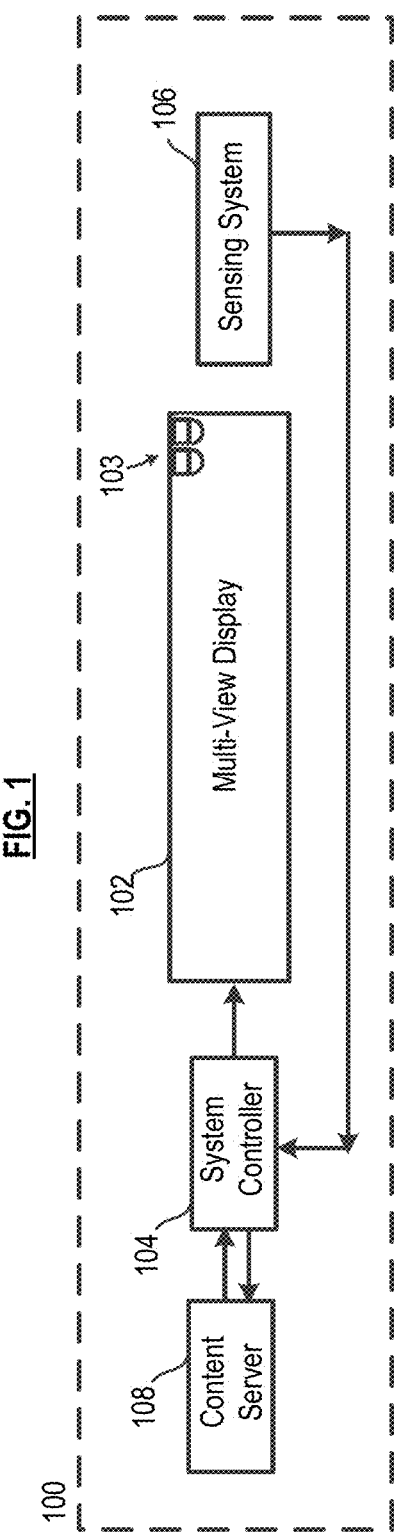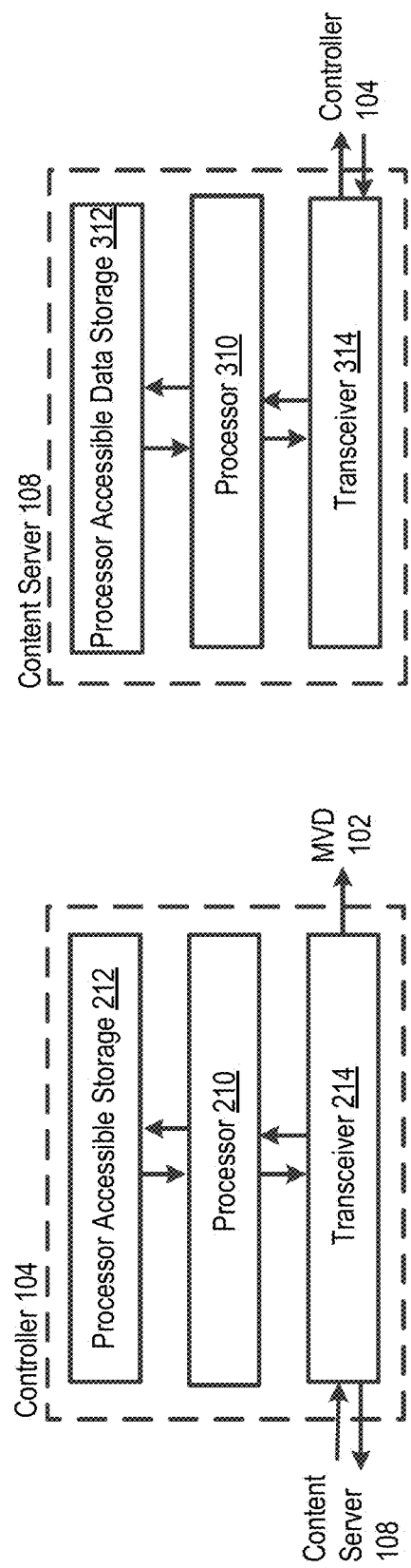

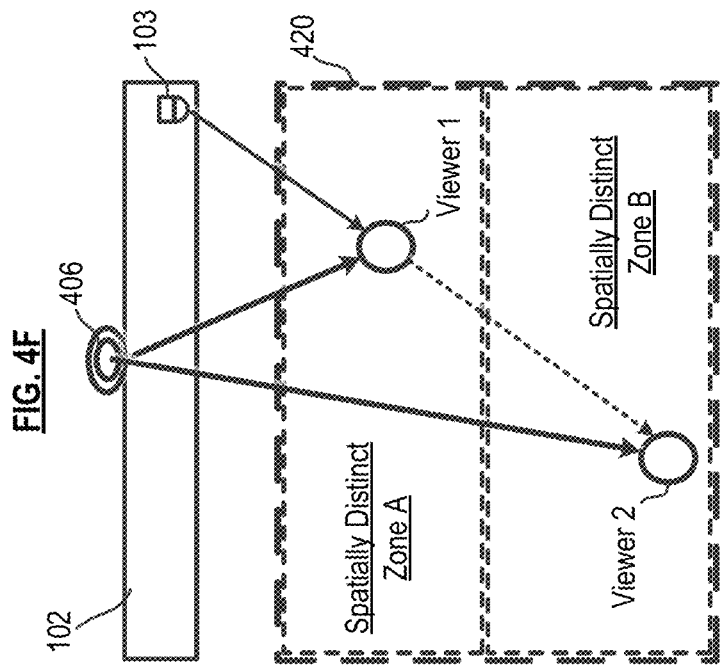
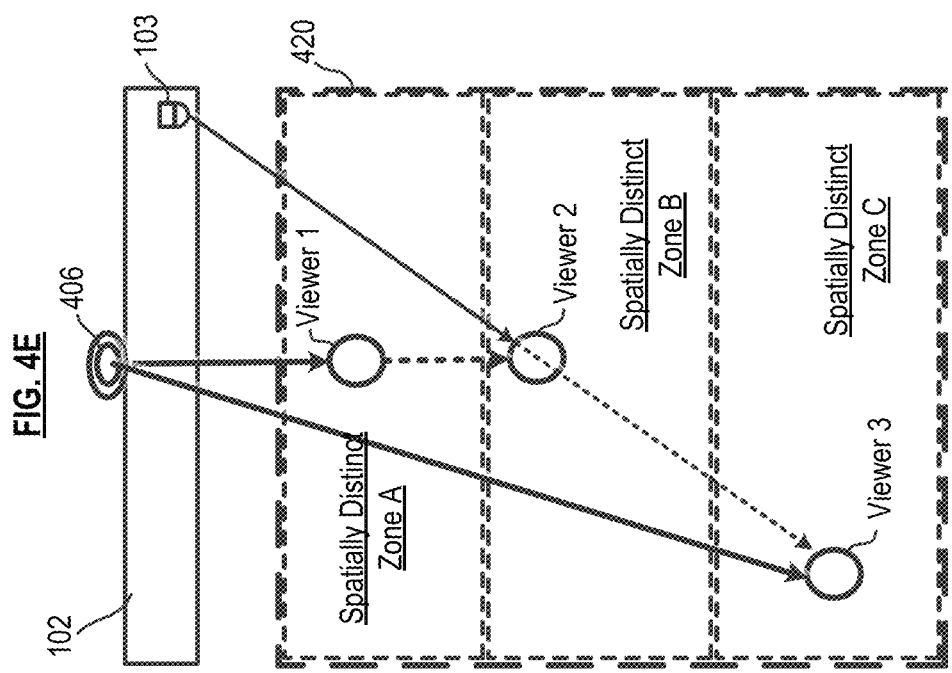

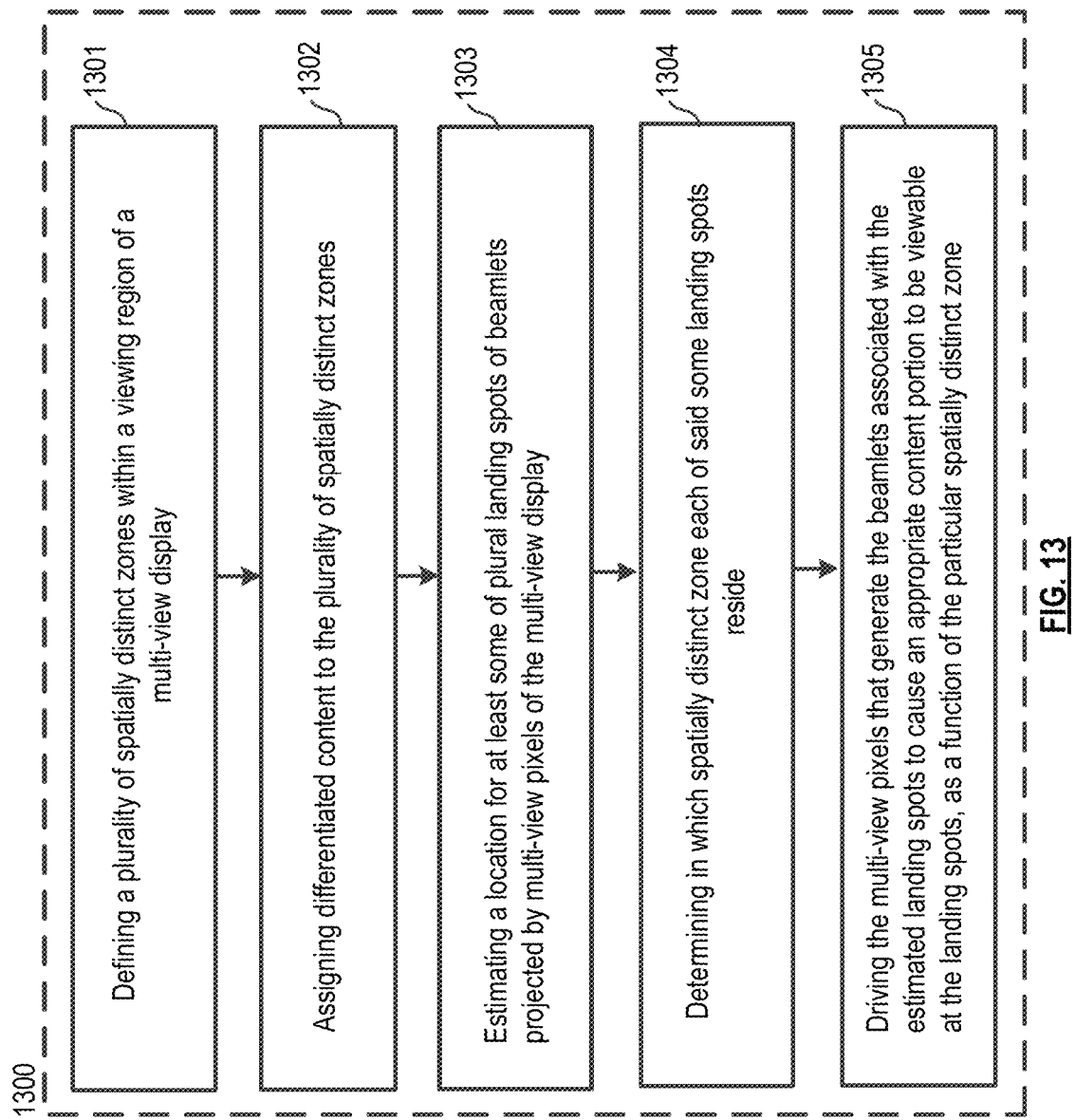

SYSTEM AND METHOD FOR DISPLAYING LOCATION DEPENDENT CONTENT

STATEMENT OF RELATED CASES

This disclosure is a continuation of U.S. patent application Ser. No. 15/060,527 filed Mar. 3, 2016, now allowed, and to which priority is claimed, and which claims priority of U.S. Pat. App. Ser. No. 62/127,434 filed Mar. 3, 2015.

FIELD OF THE INVENTION

This disclosure pertains to multi-view displays and the use thereof.

BACKGROUND OF THE INVENTION

Signs and displays are often unintelligible or irrelevant to viewers outside a limited range of distance, angles, and contexts. Depending on the location of the viewer relative to the display, the displayed content may be too small, distorted, partially blocked, or not useful, meaningful, or even of interest. In some situations, there might be a need to include more content on a display than its size permits. Or there might be a desire to enable multiple viewers to simultaneously access particular content each wishes to see. In some cases, it might be desirable to show, on the same display, a variety of media that would be incompatible, distracting, or overcrowded if viewed at the same time. In yet further situations, it might be necessary to ensure that information is displayed in a particular sequence or only at certain times.

Many factors impact the effectiveness of signs and displays. One factor is viewing location. For example, a person looking at a display from a distance might not be able to distinguish its content, which might appear too small or cluttered. Viewing a display at an extreme angle can cause content to appear distorted. And, depending on the surroundings, displayed content might be partially obstructed.

Another factor is the amount of content relative to the size of the display. Sometimes it may not be possible to include all desired content at a scale that is readily understandable from any viewing distance. A third factor is that there might be competing interests, on the part of multiple viewers or multiple sponsors, in terms of the content displayed.

Yet another factor pertains to the nature of the content itself. For example, there might be instances in which displays do not have relevant content for those viewing from a distance (as opposed to nearby) or from a differing context. Furthermore, there might be scenarios in which it is desirable to conceal content to all but a few viewers. In some cases, information intended for viewing in a particular order is viewed out of sequence. Or a display might present a variety of content that, if viewed at the same time, is incompatible. These and other situations diminish the effectiveness of signs and displays.

One solution to these problems is, of course, to install multiple displays. In such a multi-display system, there is the possibility of ensuring that there is a display at a readable distance, with an acceptable viewing angle, an unobstructed view, providing location-relevant information, which displays all appropriate messaging, properly sequenced, for all desired locations. If there is too much content on any one display, or if such content would otherwise conflict with other content, it can be distributed across the multiple displays. Drawbacks to this solution include cluttering a space with displays, having to buy, install, and maintain multiple displays, and the possibility of confusing audiences that might wander between displays in search of relevant content. Furthermore, in many cases, there might be room for only a single display.

Another solution that addresses at least some of the aforementioned problems is to cycle, over time, different content on the same display. This enables optimizing content for viewers at specific distances, angles, contexts, sight lines, and messaging sequences. When there is too much content, or in situations in which it should be viewed separately, the content is delayed and presented over time. The drawbacks to this solution are the tedium, confusion, and frustration experienced by viewers waiting for or trying to recognize content intended for their location and interest. Potential viewers might pass by the display location at the wrong time, missing the messaging intended for them, not realizing that content targeted to their needs will be shown eventually. Furthermore, each location-optimized, viewer-specific message will have reduced time on the display since it will be sharing time with other messages.

SUMMARY OF THE INVENTION

The present invention provides a way to present, simultaneously on a single display, separate/different visual media to viewers in different zones of a viewing region of the display.

The present inventors recognized that the problems discussed in the Background section, and the limitations of existing solutions, arise because at any given moment, most signs and displays present the same content for all viewers. That is true regardless of viewer location, regardless of the challenges of presenting (a substantial amount of) content at a scale that ensures it is discernable, and regardless of whether it is appropriate to show all content at the same time on the same display. Therefore, a solution that enables signs and displays to simultaneously present different content to different viewers, and to adjust that content to compensate for one or more of: viewer distance, viewer interest, amount of content, viewing angle, obstructions, location-based relevance, sequencing, mutual appropriateness, and other factors, would make many signs and displays more versatile, effective, and efficient.

Applicant has disclosed, in co-pending applications, implementations of multi-view display systems. All such systems are capable of controllably shining light of different brightness and color in different angular directions to display different content to different viewers. Applicant recognized that the multi-view display provides a basis for addressing the fact that most signs, signals, and displays present the same content for all viewers. However, for reasons that will become clearer below, the implementations of multi-view display systems previously disclosed by applicant do not address all the shortcomings discussed in the Background section. It is believed that a discussion of applicant's multi-view display technology, as previously disclosed, will be helpful in understanding the improvements wrought by embodiments of the present invention In applicant's multi-view displays, an image is formed as a collection of multi-view pixels. A multi-view pixel can control not just the brightness, but also the spatial distribution of emitted light. In particular, a multi-view pixel can be commanded, for example and without limitation, to emit light in certain directions but not others. Or it can be commanded to independently adjust the brightness of light emitted in different directions. Other parameters of emitted light can also be adjusted independently for different directions of emission.

The multi-view pixels of a multi-view display emit "beamlets" (this word does not appear in standard dictionaries). A beamlet is an element of emitted light that can be individually controlled. In particular, a beamlet is the light emitted/projected by a multi-view pixel; multiple beamlets can be emitted/projected (those terms are used interchangeably hereinafter) from each multi-view pixel in a range of directions. Each beamlet can be controlled independently of each other beamlet emitted from the same multi-view pixel and angular resolution can be very high between beamlets.

The precise direction in which an individual beamlet is emitted depends on the position and orientation of the multi-view pixel. To define the path of a beamlet in a viewing space, a calibration is advantageously performed. Calibration takes into account the positions and orientations of the multi-view pixels relative to one another and relative to the body of the multi-view display and the orientation of the multi-view display with respect to viewing environment. In some embodiments, calibration is a process that yields a table of relationships between locations in the viewing region of the multi-view display and beamlets. When an operator of the multi-view display desires to show a particular image to viewers located at a particular location, the table indicates which beamlets should be used. Calibration procedures are discussed in U.S. patent application Ser. No. 15/002,014, entitled "Method for Calibrating a Multi-view Display," filed Jan. 20, 2016 and which is incorporated by reference herein.

The functionality of the multi-view pixel is perhaps best understood by comparing it with the functionality of a conventional pixel in a conventional display. A conventional pixel is simply a light source that emits a particular type of light in all directions of emission. For example, in a conventional television set, a pixel is typically implemented with a material that glows when electrically excited. The glow is typically in one of the three primary colors. The glowing material emits colored light uniformly in all directions.

In contrast to a conventional pixel, a multi-view pixel is able to emit different light in different directions. In each direction, light of a particular type is emitted as a narrow beam—the aforementioned beamlet.

Although quite versatile compared to conventional displays, multi-view display systems are, however, limited (for each pixel) to showing different content in different directions. Embodiments of the present invention are not limited in such fashion.

A display system in accordance with the illustrative embodiment includes a multi-view display (MVD), a computer, and a sensing system.

In accordance with some embodiments of the present invention, different content is displayed to different viewing locations that are within spatially distinct zones located at different "depths" from the MVD. For example, in some such embodiments, the viewing region of the MVD is segregated into plural, spatially distinct zones that differ based on their distance from the MVD. Different content is displayed within each zone, typically (but not necessarily) based on some contextual relevance of the content to the zone. Contextual relevance between content and zone/viewing location can arise in the following non-limiting situations, among others:

The content is dependent on the environment in proximity of the zone/viewing location.

The content is selectively modified to overcome visual compromises associated with the zone/viewing location.

The content is designed to provide a sequence of content for a viewer moving relative to the display along a designated path of zones/viewing locations.

Access to particular content is achieved by viewing the display from particular zones/viewing locations.

Since, in depth-based spatially distinct zones, a given zone may be directly "behind" or "in front of" another zone with respect to the MVD (see, e.g., FIG. 4A, etc.), many viewing locations within such zones will share the same viewing angles.

Issues arise when multiple potential viewing locations within the spatially distinct zones share the same viewing angle with respect to one or more multi-view pixels of the MVD. As previously indicated, an MVD is fundamentally limited, in terms of its ability to display different content, by viewing angle. That is, only one image, etc., can be displayed for viewing at a given angle with respect to the MVD. Furthermore, in the aforementioned depth-based arrangement of zones, the potential for occlusions arises. In particular, due to the shared viewing angles in the different zones, the sightline to a particular pixel in the MVD of a first viewer in a first zone might be occluded by the presence of another viewer in a second zone. The conflict of what content to show along the shared sightline cannot be resolved without knowledge of obstructions.

To address the potential problem of shared viewing angles, in some embodiments of the invention, a sensing system obtains real-time information concerning the presence and location of "obstructions" in the spatially distinct zones of the viewing region. The obstruction (to propagation of a beamlet) can be a floor, a viewer, an inanimate object (such as a pillar, etc.), or any other presence in the spatially distinct zones of the viewing region. In some embodiments, the information is in the form of a depth map, such as can be obtained via depth-aware cameras (e.g., stereocameras, time-of-flight cameras, etc.). Such assessments of the viewing region, which can more generally be considered a 3D geometry of the viewing region, indicate the presence and location of object(s)/obstruction(s) in the viewing region. Using this information, in conjunction with calibration information pertaining to the display itself (i.e., a mathematical description that provides the path of each beamlet projected from each multi-view pixel of the MVD and the position in space of the MVD), the system can estimate landing points for the beamlets. With the landing points estimated, content portions can be assigned to each landing point as a function of its presence in a particular spatially distinct zone of the viewing region.

In some embodiments, a system for simultaneously displaying differentiated content, wherein the differentiated content includes a plurality of content portions that differ from one another, comprises: a multi-view display, wherein the multi-view display includes a plurality of multi-view pixels; a sensing system, wherein the sensing system obtains a characterization of a three-dimensional geometry of a viewing region of the multi-view display; and a controller that, using the characterization:
  (a) estimates a location of landing spots in the viewing region for at least some beamlets emitted by the multi-view pixels;
  (b) assigns content portions to at least some of the landing spots, wherein some of the content portions differ from one another; and (c) sets, based on the content assignments, the color and intensity of beamlets associated with said some landing points as a function of location in a particular spatially distinct zone.

In some embodiments, a method for simultaneously displaying, via a multi-view display, differentiated content, comprises:

defining a plurality of spatially distinct zones within a viewing region of the multi-view display;

associating, with the plurality of spatially distinct zones, the differentiated content, wherein the differentiated content comprises a plurality of content portions that differ from one another, and further wherein at least some of the content portions associated with respective ones of the spatially distinct zones differ from one another;

estimating a location for at least some of plural landing spots of beamlets projected by multi-view pixels of the multi-view display;

determining in which spatially distinct zone each of said some landing spots resides; and driving the beamlets associated with said some landing spots to cause an appropriate content portion to be viewable at said some landing spots, as a function of location in a particular spatially distinct zone.

BRIEF DESCRIPTION OF THE DRAWINGS

FIG. 1 depicts a multi-view display (MVD) system for simultaneously displaying differentiated content to spatially distinct zones in accordance with the illustrative embodiment of the present invention.

FIG. 2 depicts an embodiment of a system controller for use with the MVD system of FIG. 1.

FIG. 3 depicts an embodiment of a content server for use with the MVD system of FIG. 1.

FIGS. 4A through 4F depict the viewing region of a multi-view display segregated into spatially distinct zones and illustrate several occlusion scenarios.

FIG. 13 depicts a method for simultaneously displaying, via a multi-view display, differentiated content in accordance with an illustrative embodiment of the present invention.

DETAILED DESCRIPTION

Figure 4B:
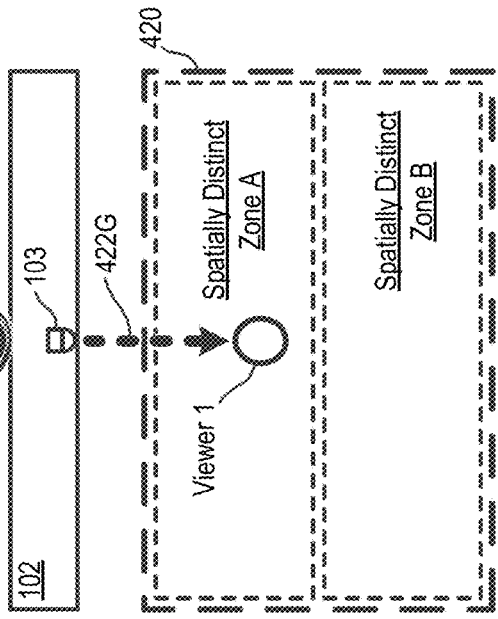

The terms appearing below and inflected forms thereof are defined for use in this disclosure and the appended claims as follows:

"associating," when used in the context of a relationship between content and a location, means that the content is intended to be displayed to the location (which can be either the specific location(s) of a viewer(s) or a zone large enough to accommodate plural viewers.

"content" means whatever is delivered to a viewer via the MVD, including, without limitation, light, color, and complex media. In some contexts, the absence of light, color, or media can be considered content, as examples.

"content portion" is the content that is displayed to a given spatially distinct zone.

"differentiated content" means plural content portions that differ from one another.

"beamlet" is an elemental entity of light emitted by a multi-view pixel in a multi-view display. The word does not appear in standard dictionaries. It has been created herein for the purposes of this disclosure and related discussions. In some implementations of multi-view pixels, a multi-view pixel resembles a conventional image projector. A conventional image projector projects a plurality of narrow light beams toward a projection screen. Each light beam resembles the beam of light emitted by a searchlight or by a lighthouse. With a conventional projector, there is one such beam for each projected pixel. Because of the large number and typically small size of such beams the word "beamlet" has been created to refer to one of them. A multi-view pixel is similar to an image projector in that it emits a number of beamlets, but the beamlets are not intended for forming an image on a screen. Rather, they are intended to fall upon the eyes of a viewer. Generally, the intended viewer is human, but optical devices such as cameras can also be used with a multi-view display, and it is possible to envision applications of multi-view displays wherein intended viewers might be non-human viewers such as animals, cameras or other image-capturing entities.

In a multi-view pixel, each beamlet's light can be controlled independently of the light of other beamlets. For example, and without limitation, the light intensity and/or color of an individual beamlet might be controllable independently of the intensity and/or color of the light of other beamlets. Other parameters of beamlet light might also be controlled, such other parameters comprise, for example, spectral composition, polarization, beamlet shape, beamlet profile, overlap with other beamlets, focus, spatial coherence, temporal coherence, etc., to name just a few.

A viewer that looks at a multi-view pixel sees the light of one or more beamlets; in particular, the viewer sees the light of those beamlets that are emitted by the multi-view pixel and fall upon a viewer's pupil. The viewer perceives the multi-view pixel as glowing with the combined light of those beamlets. As with conventional pixels, a multi-view pixel can have a variety of shapes, as perceived by the viewer that looks at the multi-view pixel.

A beamlet is distinct from a ray in that, like a flashlight beam, they extend over a range of angles. However, in most implementations, they are quite narrow. For convenience of description, the beamlet can be approximated as a ray with a well defined direction and single point of intersection with an illuminated surface.

"multi-view display" is a display able to show different images to different viewers. Based on the position of the viewer relative to the multi-view display, individual viewers may see different images from one another while simultaneously looking at the same multi-view display. This is in contrast to conventional displays, which show the same image to all viewers regardless of where the viewers are positioned relative to the display. In a multi-view display an image is formed as a collection of pixels that comprises multi-view pixels.

"multi-view pixel" is the smallest image-forming unit of a multi-view display. A multi-view pixel is a more flexible version of the type of pixel used in conventional (non-multi-view displays). In a typical conventional display, pixels emit light in response to electrical excitation, and the brightness of a pixel depends on the extent of excitation. Each conventional pixel emits light in all directions, such that all viewers perceive the pixels the same way, regardless of viewer position.

A multi-view pixel, instead, can control not just the brightness, but also the spatial distribution of emitted light. In particular, a multi-view pixel can be commanded, for example, to emit light in certain directions but not others; or it can be commanded to independently adjust the brightness of light emitted in different directions. Other parameters of emitted light can also be adjusted independently for different directions of emission.

"viewing region" of a multi-view display means the range of possible positions from which viewers of the multi-view display can experience the multi-view display functionality. In particular, the multi-view pixels of the multi-view display can emit beamlets in a range of possible directions. A viewer must be within that range in order to see at least one beamlet; otherwise, the multi-view pixel will not be usable for image forming. For a viewer to see an image that covers the entire display surface of the multi-view display, the viewer must be within the beamlet range of all multi-view pixels. The viewing space is any place in which at least one beamlet of a multi-view pixel of the multi-view display is observable.

Display designers are typically given a target range of possible positions for viewers to view a display. In a multi-view display, it is advantageous to orient multi-view pixels, relative to one another, such that all beamlet ranges overlap at all those viewer positions. Generally, this is likely to result in different orientations of multi-view pixels in different portions of the display surface, and it will be difficult to know, a priori, the relative orientation of all multi-view pixels. Calibration, such as discussed in co-pending U.S. application Ser. No. 15/002,014, can provide the necessary orientation information and thus allow display designers the freedom to orient multi-view pixels as needed.

"Spatially distinct zone" are one or more defined sections within the viewing region. Within a given spatially distinct zone, the MVD provides a common experience, such as by displaying the same content to viewers anywhere within that zone. The content assigned to a particular spatially distinct zone is, in some cases, assigned based on the existence of a contextual relationship between the content and the zone. A non-limiting example of such a contextual relationship is that if a first spatially distinct zone is closer to an MVD than a second spatially distinct zone, the content presented to the first spatially distinct zone might include more text, smaller text, or a more detailed image, etc., than the content presented to the second spatially distinct zone. The content displayed to the first and second spatially distinct zones, as in the example, are referred to individually as "content portions," as per the definition above. To the extent that the content portions that are displayed to the first and second spatially distinct zones differ from one another, they are collectively referred to as "differentiated content." In embodiments in which there are plural spatially distinct zones within the viewing region (as is typical), such zones need not be contiguous. As applicable, each spatially distinct zone can be considered a three-dimensional space (i.e., an area and height) or simply an area.

"Viewing location" is a specific location from which a single viewer may observe the display. There will typically, but not necessarily, be plural viewing locations in a spatially distinct zone or in the viewing region.

Additional Definitions Appear throughout the Disclosure in Context.

FIG. 1 depicts system 100 for displaying location dependent content. System 100 includes multi-view display (MVD) 102, system controller 104, sensing system 106, and content server 108.

MVD 102 is capable of displaying different images to different viewers based on a difference in viewing location. The principle of operation of an MVD is known to those skilled in the art and so will be discussed only briefly. The salient difference between a traditional display, such as LCD, LED, plasma, or projection display on the one hand, and a multi-view display on the other, is that the former displays the same image to all viewers while the latter is able to display different images to different viewers simultaneously.

As previously discussed, MVD 102 includes one or more projection elements or "multi-view pixels" 103, which emit light of different color and brightness at different angles. In some embodiments, each projection element includes a light source, an imager, and a lens. Examples of suitable imagers include, without limitation, digital micro-mirror devices, liquid crystals, light emitting diodes, and/or liquid crystal on silicon (LCOS). Each projection element can be considered to be a single pixel of the display; hence the moniker "multi-view pixel." A full graphic multi-view display is formed from an array of such projection elements. In some embodiments, each multi-view pixel is controlled by its own processor. In some other embodiments, a processor controls plural multi-view pixels, but less than all of those composing the MVD. In some embodiments, all of such processors in the MVD connected via a network (e.g., Ethernet, Infiniband, $I^2C$, SPI, Wi-Fi, etc.), or, more generally, a communication channel (e.g., HDMI, etc.).

The light source illuminates the imager and the imager filters or directs the light through the lens. The lens is capable of directing light, received from different locations of the imager, in different directions. For example, a multi-view pixel with a resolution of 1920×1080 is capable of controllably directing light (each controllable beam referred to herein as a "beamlet") in over two million directions. The color and brightness in different directions, corresponding to different beamlets, can be different. Each element, from a viewer's perspective, appears to be a light source of the color and brightness of the light (beamlet) that is projected onto the viewer, even if the projection is too dim for any image to be visible on nearby surfaces. As a consequence, the appearance of each multi-view pixel from the perspective of a viewer is dependent upon the angle at which the viewer views it.

The operation of MVD 102 is managed via a system controller, such as system controller 104, which is depicted in further detail in FIG. 2. The system controller directs the operation of the multi-view display. For example, in some embodiments, system controller 104 will fetch content from content server 108 and then direct the operation of MVD 102, causing the MVD to display specific content to a specific location in the viewing region.

As depicted in FIG. 2, system controller 104 includes processor 210, processor-accessible storage 212, and transceiver 214.

Processor 210 is a general-purpose processor that is capable of, among other tasks, executing an operating system, executing device drivers, and executing specialized application software used in conjunction with the embodiments of the invention. Processor 210 is also capable of populating, updating, using, and managing data in processor-accessible data storage 212. In some alternative embodiments of the present invention, processor 210 is a special-purpose processor. It will be clear to those skilled in the art how to make and use processor 210.

Processor-accessible data storage 212 is non-volatile, non-transitory memory technology (e.g., ROM, EPROM, EEPROM, hard drive(s), flash drive(s) or other solid state memory technology, CD-ROM, DVD, etc.) that store, among any other information, data, device drivers (e.g., for controlling MVD 102, etc.), and specialized application software, which, when executed, enable processor 210 to direct MVD 102 to present differentiated content for viewing by viewers in various spatially distinct zone of the viewing region of MVD 102. It will be clear to those skilled in the art how to make and use processor-accessible data storage 212.

Transceiver 214 enables communications with content server 108 and other devices and systems via any appropriate medium, including wireline and/or wireless, and via any appropriate protocol (e.g., Bluetooth, Wi-Fi, cellular, optical, ultrasound, etc.). The term "transceiver" includes any communications means and, as appropriate, various supporting equipment, such as communications ports, antennas, etc. It will be clear to those skilled in the art, after reading this specification, how to make and use transceiver 214.

Although the illustrative embodiment depicts a single controller 104, in some embodiments, the functionality of controller 104 is distributed among several devices that might or might not properly be characterized as controllers.

As will be appreciated by those skilled in the art, the foregoing provides a description of one of a variety of different implementations of a multi-view display. Any implementation of an MVD known to those skilled may suitably be used.

Content server 108, which is depicted in further detail in FIG. 3, includes processor 310, processor-accessible storage 312, and transceiver 314. Content server 108 includes stored content, as appropriate for the particular use application.

Processor 310 is a general-purpose processor that is capable of, among other tasks, executing an operating system and executing specialized application software used in conjunction with the embodiments of the invention. Processor 310 is also capable of populating, updating, using, and managing data in processor-accessible data storage 312. In some alternative embodiments of the present invention, processor 310 is a special-purpose processor. It will be clear to those skilled in the art how to make and use processor 310.

Processor-accessible data storage 312 is non-volatile, non-transitory memory technology (e.g., ROM, EPROM, EEPROM, hard drive(s), flash drive(s) or other solid state memory technology, CD-ROM, DVD, etc.) that store, among any other information, data (such as content) and specialized application software, which, when executed, enable processor 310 to generate/select content for display via MVD 102. It will be clear to those skilled in the art how to make and use processor-accessible data storage 312.

Transceiver 314 enables communications with, for example and without limitation, system controller 104, and the Internet, such as to access web sites, as appropriate, via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 314.

Although the illustrative embodiment depicts a single content server 108, in some embodiments, the system includes multiple content servers. Furthermore, in some embodiments, the functionality of content server 108 is distributed among other elements of system 100, such as system controller 104.

Sensing system 106 is discussed in conjunction with FIGS. 4A through 4F. As previously indicated, sensing system is required in any situation where multiple potential viewing locations share the same viewing angle of one or more multi-view pixels. As discussed in more detail later in this disclosure, in some embodiments, the viewing region of MVD 102 is segregated into a plurality of "depth-related" spatially distinct zones. In this context, the phrase "depth-related" means that the zones differ spatially based on their distance to MVD 102 (measured orthogonally to the MVD viewing surface).

Figure 4D:
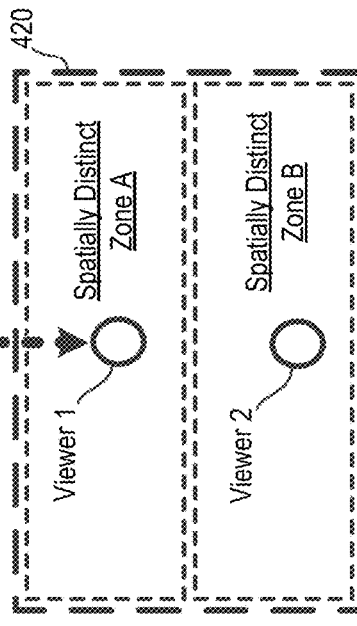
Figure 4A:
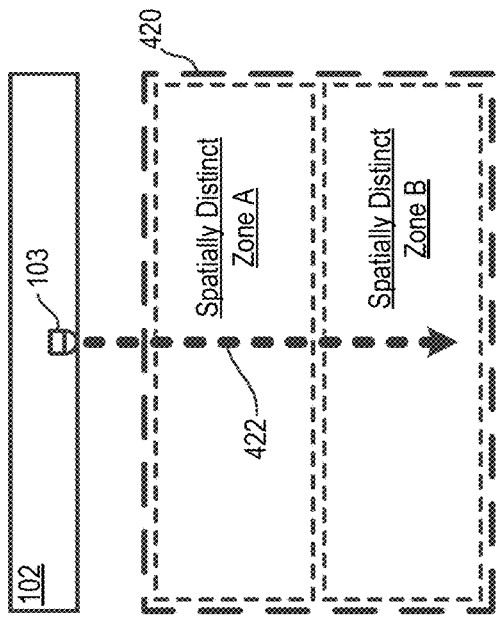

FIG. 4A depicts viewing region 420 (of MVD 102) having two depth-related spatially distinct zones: A and B. Spatially distinct zone B is directly "behind" and further from MVD 102 than spatially distinct zone A. As depicted in FIG. 4A, in the absence of any object impeding its path, beamlet 422, which is projected at a 0 degree angle from central multi-view pixel 103 of MVD 102, passes through both viewing zones.

In accordance with some embodiments of the invention, differentiated content—plural content portions, wherein the content of each such portion differs—is displayed to viewers in different spatially distinct zones. Consequently, a viewer standing in the forward-most zone (i.e., spatially distinct zone A) should see different content than if she were standing in rear-most zone (i.e., spatially distinct zone B). However, because the two viewing zones share the same angle, the content cannot be differentiated without augmenting the multi-view display technology.

In accordance with the illustrative embodiment, sensing system 106 obtains a real-time assessment of the viewing region. This assessment provides information concerning the presence of objects in the viewing region and their location; that is, a 3D-geometry of the viewing region. In many of the scenarios contemplated, there will likely be some viewers changing locations, such that sightlines to MVD 102 from various locations will be changing between occluded and non-occluded on a regular (but not necessarily predictable) basis. For this reason, assessments of the viewing region must be regularly updated by sensing system 106.

In some embodiments, sensing system 106 is implemented as, without limitation, depth sensors, structured light sensors, arrays of 2D cameras, or depth-aware cameras (e.g., stereocameras, time-of-flight cameras, etc.). In some embodiments, a depth map of the viewing region is obtained.

For each "frame" (i.e., each new "snap shot" of the viewing region obtained by sensing system 106), the depth map or other geometrical rendering of the viewing region is processed to determine, ultimately, what color/brightness to show for each beamlet projected from the multi-view pixels of MVD 102. In some alternative embodiments, to avoid or at least ameliorate latency issues, the system can predict what the geometry of the viewing region will be when the next frame is shown. Thus, any estimate of the geometry of the viewing region can use current sensor data as well as historical sensor data.

Although in some embodiments, the locations of individual objects in the viewing region are established, in other embodiments, operations (e.g., identify, recognize, locate, etc.) are not performed on a per-object basis. Rather, in some embodiments, the sensing system simply estimates the 3D-geometry of everything present in the viewing region (e.g., a depth map). As known to those skilled in the art, there are a variety of ways to represent the data obtained by a depth map, etc. For example, the depth map can be translated into a point cloud, or points in a point cloud can be connected to form a mesh, such as a triangle mesh, for the purpose of filling in gaps between the points.

The location information is used, in conjunction with calibration information (the path of each beamlet projected from each multi-view pixel) to estimate the location of "landing spots" for beamlets in the viewing region. Based on the location of a landing spot in a particular spatially distinct zone, content is assigned to the land spot. For each such land spot, the multi-view pixels are controlled (by system controller 104) to project beamlets of appropriate color and brightness to the landing spot to present the associated content to the viewer via MVD 102. This process is described in further detail later in this specification.

Referring now to FIG. 4B, viewer 1 is located in spatially distinct zone A. Based on the content that is intended (e.g., by the operator of the MVD system, content sponsors, etc.) for viewing in zone A, assume that viewer 1 is supposed to see "green" (color) from the center multi-view pixel 103 of MVD 102. Sensing system 106, implemented, for example, as depth-aware camera 406, obtains the 3D-geometry of viewing region 420, sensing the presence of viewer 1 in spatially distinct zone A. After appropriate processing, as discussed above, the system controller (not depicted), causes center multi-view pixel 103 to send green beamlet 422G towards viewer 1 in spatially distinct zone A.

Figure 4C:
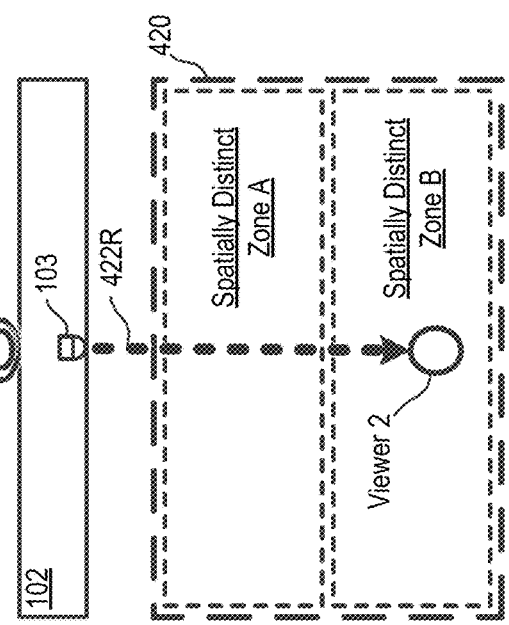

Referring now to FIG. 4C, viewer 2 is located in spatially distinct zone B. Based on the content that is intended for viewing in zone B, assume that viewer 2 is supposed to see "red" from center multi-view pixel 103 of MVD 102. Sensing system 106, implemented, for example, as depth-aware camera 406, obtains the 3D geometry of viewing region 420, this time sensing viewer 2 in spatially distinct zone B. After appropriate processing, the system controller (not depicted), causes center multi-view pixel 103 to send red beamlet 422R towards viewer 2 in spatially distinct zone B.

With reference to FIG. 4D, viewer 1 is located in spatially distinct zone A and viewer 2 is located in spatially distinct zone B. Once again, a viewer in zone A is intended to see green from center pixel 103 and a viewer in zone B is intended to see red from the center pixel. Because viewer 1 occludes viewer 2 (for a centrally positioned sensing system), depth-aware camera 406 only detects viewer 1. Consequently, center multi-view pixel 103 is controlled to send green beamlet 422G in the direction of viewer 1. Ideally, this is correct, since viewer 2 would not be able to see center multi-view pixel 103 because of the presence of viewer 1.

The discussion of FIG. 4D presumes that depth-aware camera 406 is co-located with the center multi-view pixel. Generally, the sensing system will not have the same viewpoint as any particular multi-view pixel, so it is likely that it will sense the presence of viewer 2. However, based on the previously discussed methodology for predicting landing spots, controller 104 will recognize the occlusion and act accordingly (such as by not sending a red beamlet from the center multi-view pixel).

In some embodiments, this processing is performed for all points of a given depth assessment simultaneously, so that the appropriate content is sent in all directions for all multi-view pixels of MVD 102. Therefore, no viewer/object recognition or other complex algorithms are required.

FIG. 13 depicts method 1300 in accordance with the illustrative embodiment. In accordance with task 1301 of the method, a plurality of spatially distinct zones is defined within a viewing region of the multi-view display. A mathematical description of the spatially distinct zones in the viewing region is developed, such as by controller 104 or otherwise provided based on application specifics. The zone is described in three dimensions. Content, such as is stored in content server 106, is assigned to the various spatially distinct zones based on some contextual relationship or relevance between the zone and the content. Examples of such relationships are described later in this specification.

Per task 1302, differentiated content is assigned to the plurality of spatially distinct zones. The assignment is based on application specifics and is performed by the system controller.

In accordance with task 1303, a location is estimated for at least some of plural landing spots of beamlets projected by multi-view pixels of the multi-view display. This is performed using the 3D-geometry of the viewing region obtained by the sensing system as well as specifications of the MVD itself. In particular, a specification accompanying each MVD will provide, for each beamlet of each multi-view pixel, a set of parameters that specify the path of the beamlet through space. Such information is not particularly useful by itself; it must be referenced to an actual viewing environment. As such, when MVD 102 is installed for use, the specification for the beamlets must be mapped to the actual viewing environment. This mapping is performed as part of a calibration procedure that is described in Ser. No. 15/002,014, previously referenced.

Knowing the path of each beamlet projected from each multi-view pixel through space, and having a mathematical description of the spatially distinct zones, the system can determine, for any "point" in the spatially distinct zones, which beamlets intersect that point.

The only beamlets that might be required to carry information (e.g., color and intensity, etc.) are those that have a "landing spot" in one of the spatially distinct zones of the viewing region. That is, a beamlet will propagate through space until it intersects an "obstruction," such as the ground, a person, an inanimate object, etc. To estimate the location of such landing spots, a 3D geometric description of the viewing region is required. As previously discussed, sensing system 106 provides this information. Knowing the paths of all beamlets from all multi-view pixels, and having an estimate of the geometry of the viewing region, the system can estimate any points of intersection—landing spots— between beamlets and obstructions in the viewing region. Since viewers may be moving in and out of the viewing region on a substantially regular basis, the geometrical "snap shot" of the viewing region must be regularly obtained or otherwise estimated (e.g., based on historical data, etc.).

In task 1304, the controller determines in which spatially distinct zone at least some the landing spots reside. This is readily determined from the location estimate of the landing spots and the mathematical description of the zones.

Per task 1305, the beamlets associated with said some landing spots are driven by the controller to cause an appropriate content portion to be viewable at said some landing spots, as a function of location in a particular spatially distinct zone. This involves setting the color and intensity of the beamlets associated with each landing point.

The foregoing is a non-optimal, straightforward way to provide differentiated content to viewers in the appropriate spatially distinct zones. The foregoing approach is non-optimal because it is slow, even with highly parallelized computations. For example, graphical processing units are designed to efficiently render triangles/polygons, not individual points. Also, if a depth map, for example, consists of a collection of discrete points rather than a continuous surface, then there will be holes between points that would be missed. Consequently, it is generally more optimal to reduce the depth map into collections of polygons to render, with each polygon consisting of multiple points. As will be appreciated by those skilled in the art, there are many image-processing techniques for use in reducing the depth map into polygons.

One exemplary technique is to quantize the viewing environment into a three-dimensional grid of rectangular segments. The segments are represented as a series of 2D planar grids, wherein each grid is at a different depth. On each frame, each point of the depth map is quantized to the nearest segment. Once all points have been quantized, the segments that were quantized are the polygons towards which the MVD will drive content.

There are many image-processing techniques that can suitably be used to process the depth information. A few non-limiting examples include:
  removal of all depth points that lie outside any of the spatially distinct zones;
  standard triangle-mesh generation techniques;
  coalescing adjacent polygons into larger polygons;
  background subtraction; and
  viewer, face, body, head and/or object detection.

In the case of a large MVD, or in the case where a depth sensor is substantially offset from the MVD, a viewer may be occluded from the depth sensor, while still visible from at least a portion of the display. In such a situation, because the viewer is not visible to the depth sensor, the viewer might be presumed not to exist in his or her location, and therefore might be shown all or portions of an image intended for a viewing location that is actually behind the viewer. FIG. 4E depicts such a scenario, where depth-aware camera 406 is offset from multi-view pixel 103 of MVD 102. Three viewers—viewer 1, viewer 2, and viewer 3—are each standing in separate viewing locations in spatially distinct zones A, B, and C, respectively, wherein the MVD is controlled such that each zone will be presented with different content via MVD 102.

Viewer 1 and viewer 3 are within view of depth-aware camera 406, whereas viewer 2 is occluded by viewer 3 and is presumed, therefore, not to exist. However, viewer 2 is at the same viewing angle of multi-view pixel 103 as viewer 3, who, as previously noted, is visible to depth-aware camera 406. Consequently, multi-view pixel 103 will incorrectly direct the content intended for viewer 3 to viewer 2. In some embodiments, multiple depth sensors are used to reduce the amount of occlusion in the viewing environment.

FIG. 4F depicts a scenario wherein a viewer is occluded from at least a portion of MVD 102 yet remains visible to the depth sensor. In particular, viewer 1 occludes viewer 2 from multi-view pixel 103, but both viewers are visible to depth-aware camera 406. In this scenario, both viewers correspond to the same viewing angle of the pixel 103, requiring an arbitration mechanism to determine which content to display at that viewing angle. In some embodiments, the distance to the display is used as an arbitration criterion. That is, the viewer closer to MVD 102 (viewer 1 in FIG. 4F) is showed the appropriate content assuming that the viewer further from MVD 102 is occluded and might not be able to see MVD 102.

Figure 5:
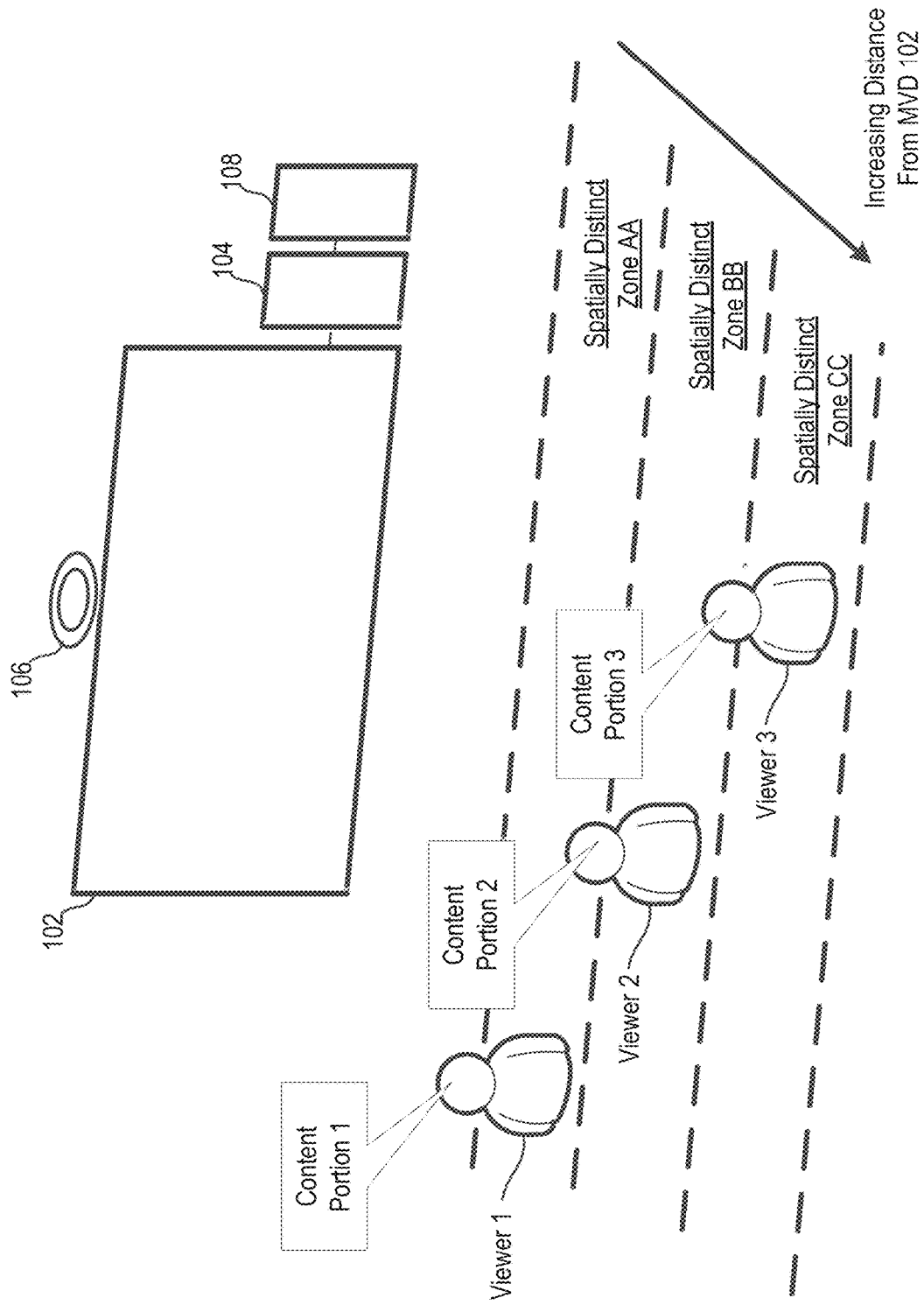
FIG. 5 depicts the system of FIG. 1 and an associated viewing region segregated into a first arrangement of spatially distinct zones for viewing differentiated content.

FIG. 5 depicts system 100, previously referenced, wherein the sensing system is embodied as depth-aware camera 406. In this embodiment, system controller 104 "segregates" viewing region 520 into a plurality of spatially distinct zones AA, BB, CC. It is to be understood that this process does not result in a physical segregation of viewing region 520. Rather, coordinates, distances, etc., that provide a definition of the viewing region 520 are generated by system controller 104 and stored, for example, in processor-accessible storage 212. Notwithstanding the foregoing, in some embodiments (some of which are described later herein), an operator of the system could choose to visually demarcate the regions for the convenience of viewers, as appropriate.

In the embodiment depicted in FIG. 5, the segregation into zones is depth based. That is, each zone exists within a certain range of distance from MVD 102. In this embodiment, distance is measured in the orthogonal direction from MVD 102. The range of distances that define any particular zone are dependent, primarily, on the particular application (which will dictate the size of MVD 102). For example, if MVD 102 is located out-of-doors and is intended to welcome guests to a resort and provide other information, it is likely to be billboard-size. And the associated spatially distinct zones are likely to be relatively large and extend relatively far from the MVD. On the other hand, if MVD 102 is situated indoors in a hallway, it is likely to be a "TV-size" monitor (c.a., 36-55 inches) and the associated spatially distinct zones will be relatively narrow and will not extend far from the MVD.

The depth-based arrangement of zones AA, BB, and CC is likely to give rise to the shared viewing angle problem, as previously described. Consequently, depth sensor 406 must routinely assess region 520 to provide a 3D-geometry thereof.

With continued reference to FIG. 5, viewer 1 is located in spatially distinct zone AA, viewer 2 is located in spatially distinct zone BB, and viewer 3 is located in spatially distinct zone CC. As previously described, by virtue of the information from depth-aware camera 406, previously-acquired calibration information pertaining to the multi-view pixels in MVD 102, and content stored in content server 108, controller 104 (either by itself or in conjunction with other processors within system 100) is able to set the color and intensity of beamlets associated with each landing point as a function of their location in a particular spatially distinct zone. Consequently, viewer 1 receives content portion 1, viewer 2 receives content portion 2, and viewer 3 receives content portion 3. In most embodiments, these content portions will differ from one another, thus collectively defining differentiated content.

Figure 6A:
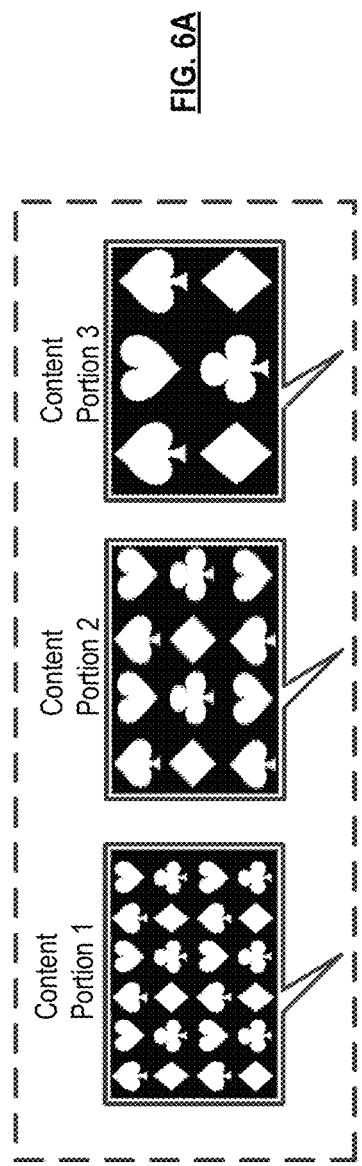
FIGS. 6A through 6C depict, for various embodiments, three different content portions displayed to the three viewers, based on their location in one of the various spatially distinct zones of FIG. 5.
Figure 6B:
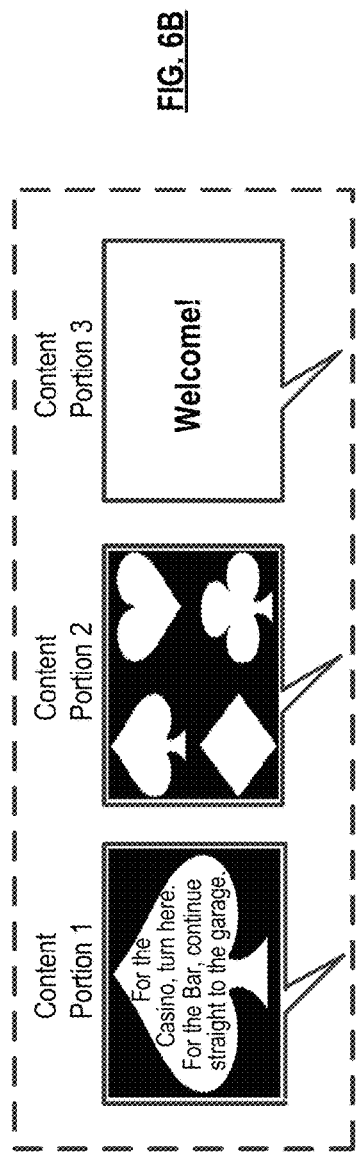
Figure 6C:
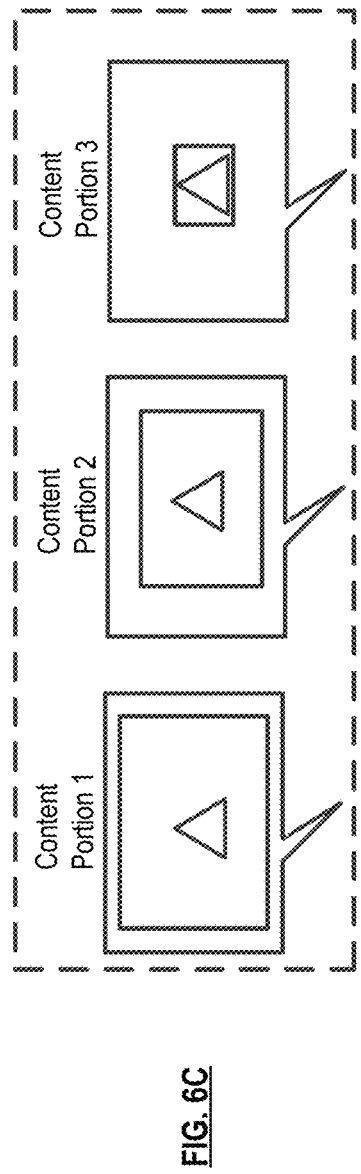

FIGS. 6A-6C depicts scenarios, applications, and uses for system 100 and the manner in which the spatially distinct zones are organized.

FIG. 6A depicts a situation wherein three content portions are created for MVD 102 in a situation where viewers standing far away have difficulty reading content that is easily seen by people who are close. For example, content portion 1 is displayed to viewers in zone AA, who are standing within 10 feet of MVD 102. Content portion 2 is displayed to viewers in zone BB, who are standing more than 10 feet and less than 20 feet from MVD 102. Finally, content portion 3 is displayed to viewers in zone CC who are more than 20 feet from MVD 102. Content portion 1 provides an abundance of content, the font and pictures are small, an intricate font style may be used, subtle low-contrast colors may be used, images can be highly detailed, design styling and theming can be more nuanced, and the composition can be complex. Content portions 2 and 3, which are shown to viewers that are successively further from MVD 102, exhibit less content, use larger font and images, the font style will tend to be relatively cleaner and bolder, bright high-contrast colors are typically selected, styling and composition are simple, etc. In this example, all three versions are simultaneously shown on MVD 102, but viewers are only able to see the version designed and optimized for their distance from the MVD 102.

Referring now to FIG. 6B, viewer 3, furthest from MVD 102, sees a welcome message, perhaps welcoming the viewer to a resort. Viewer 2, who is in zone BB and is relatively closer to MVD 102 than viewer 3, sees a logo of the resort. Viewer 3, who is in zone AA and is closest to MVD 102, sees smaller content, such as directions to various features or amenities within the resort, which would be legible to only those closest to the display.

Referring now to FIG. 6C, MVD 102 displays an image that simultaneously appears to be the same size for viewers at any distances. Viewer 1 in zone AA sees an image that takes up a small percentage of the display area, viewer 2 in zone BB sees the image take up a larger percentage of the display area. Because viewer 1 is relatively closer to MVD 102 and viewer 2 is relatively farther therefrom, they both perceive the image as the same size. Viewer 3, standing even further away in zone CC sees an image that takes up the entirety of the display. All three viewers simultaneously perceive the image as being the same size, though standing at different distances from the display. In this example, prescribed spatially distinct zones are used. In some other embodiments, zones are not designated; rather, the sensing system estimates the distance of viewing locations and generates graphics of the appropriate size for each such viewing location.

In another example, not depicted, a retail marquee based on a multi-view display contains a logo, business name, and operating hours. There are three versions of content on the display, all shown at the same time, but with each version assigned to one of the zones and only visible to viewers in the appropriate zone. Viewers in close proximity see everything—the logo, name, and information—while viewers at medium distances only see the logo and business name, which have been enlarged for better visibility. Viewers at even greater distances see only the logo, which can cover the entire display area for maximum scaling and optimal visibility.

In a similar example, not depicted, a roadside display presents a huge graphic logo to drivers a half-mile away. As drivers approach to within a quarter mile, they are shown a medium-size logo as well as the business name. Finally, as drivers pass in close proximity to the MVD, they are shown a small size logo, the business name, and the company slogan. Three versions of content are simultaneously shown, but each of the three versions is visible only to drivers at a specified range of distances. The scale and contents of the display can therefore be optimized specifically for drivers at each of these three ranges of distance. Of course, the number of distance ranges can vary, as can the types of content and other particulars.

Another example, not depicted, is a multi-view display embodied as a movie theater marquee. When viewed from the street, only the theater name is shown, filling the entire display. Moving closer, such as into the theater's parking lot, the name of the theater is shown at a smaller scale, accompanied by the title of each movie playing at the theater. Getting even closer, such as in-line to purchase tickets, the theater name, movie titles, show times, and prices, are all shown. Once again, there are three differing content portions (i.e., differentiated content), each simultaneously visible from a separate zone, and each scaled for ease of viewing depending on the distance of the zone from the display/marquee.

In the foregoing examples, non-overlapping viewing zones may be established within the sightlines of MVD 102. Content is created that compensates for the distance of these zones from MVD 102 to enable best legibility and discernibility. This means viewers in any or all of these zones may simultaneously see on the MVD differentiated content that has been customized for their distance from the display.

Figure 7:
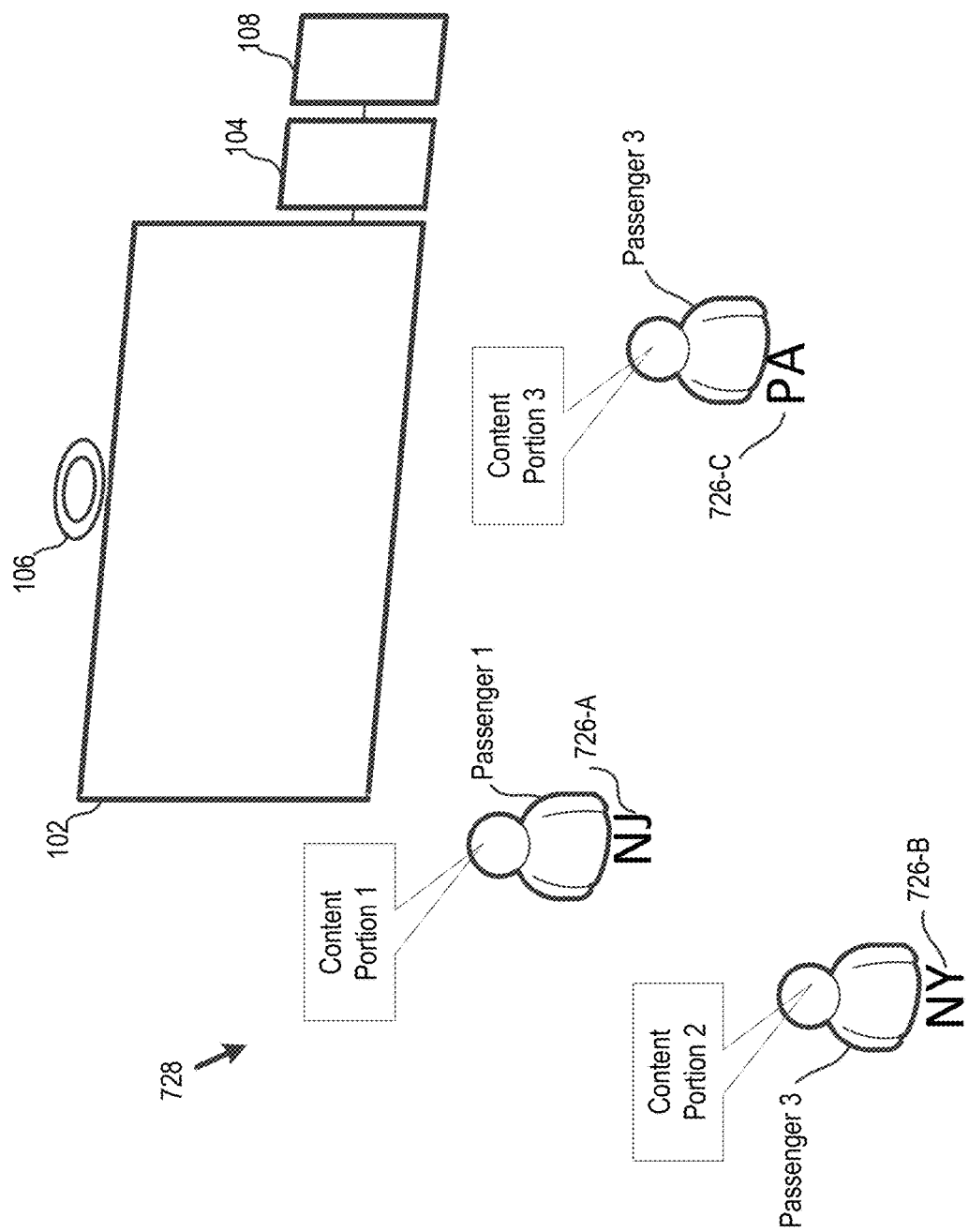
FIG. 7 depicts the system of FIG. 1 and an associated viewing region segregated into a second arrangement of spatially distinct zones for viewing differentiated content.

FIG. 7 depicts a way to provide directions to viewers for accessing subject matter provided by a MVD system. In particular, an indicium indicative of the subject matter is placed on the floor. Viewers then stand on or near the indicium (e.g., pictures, words, etc.), to view the indicated content. For example, passenger 1, at bus station 728, stands on the letters "NJ" to access the schedule for buses to New Jersey on MVD 102. Passenger 2 stands on the letters "NY" to access the schedule for buses to New York, and Passenger 3 stands on the letters "PA" to access the schedule for buses to Pennsylvania. This enables each person standing on different designations on the floor to simultaneously see different content portions on MVD 102.

Variations on this example include having passengers at an airport standing on the logo of their chosen airline to see information specific to that carrier, or standing on the face of a clock to see, on an MVD, departures for a specific time.

In another example, consider an MVD in a city tourism center. By standing on attractions highlighted on a map on the floor, visitors can view the operating hours, admission prices, wheelchair accessibility, distance, and other information for each specific attraction.

There are many alternatives for instructing people on where to stand to access specific information on a multi-view display. The instructions ca n be provided overhead, such as on the ceiling or on banners. In some further embodiments, the instructions are projected on the ceiling, floor, or nearby objects or features. In some further embodiments, instructions or cues are embedded in the floor that are touch or proximity-activated. In some embodiments, the instructions, whether graphical, representative, literal, color-coded, etc., are interactive so they can be controlled by viewers themselves, in some cases in conjunction with motion detectors or other devices.

Multi-view displays can be used in conjunction with content design and viewing area layout design to increase the quantity of content available on a display, to separate the content that is to be shown on the same display, or to provide control to viewers in accessing different content on a display.

In some embodiments, it is desirable to show many versions (e.g., pages, screens, tabs) of content independent of the need to alter the size of font and images relative to viewing distance. To achieve this, in some embodiments, a series of viewing locations are established with each location corresponding to a different version of content. A viewer shifts locations to access different content. The series of locations may be in the form or arrangement of an invisible grid whereby a viewer could shift backward, forward, side-to-side, up-or-down, or diagonally to view the various content portions available on the MVD. Different viewers can simultaneously see different content portions when standing in different zones, or may see the same content portion when standing in the same zone.

Figure 8:
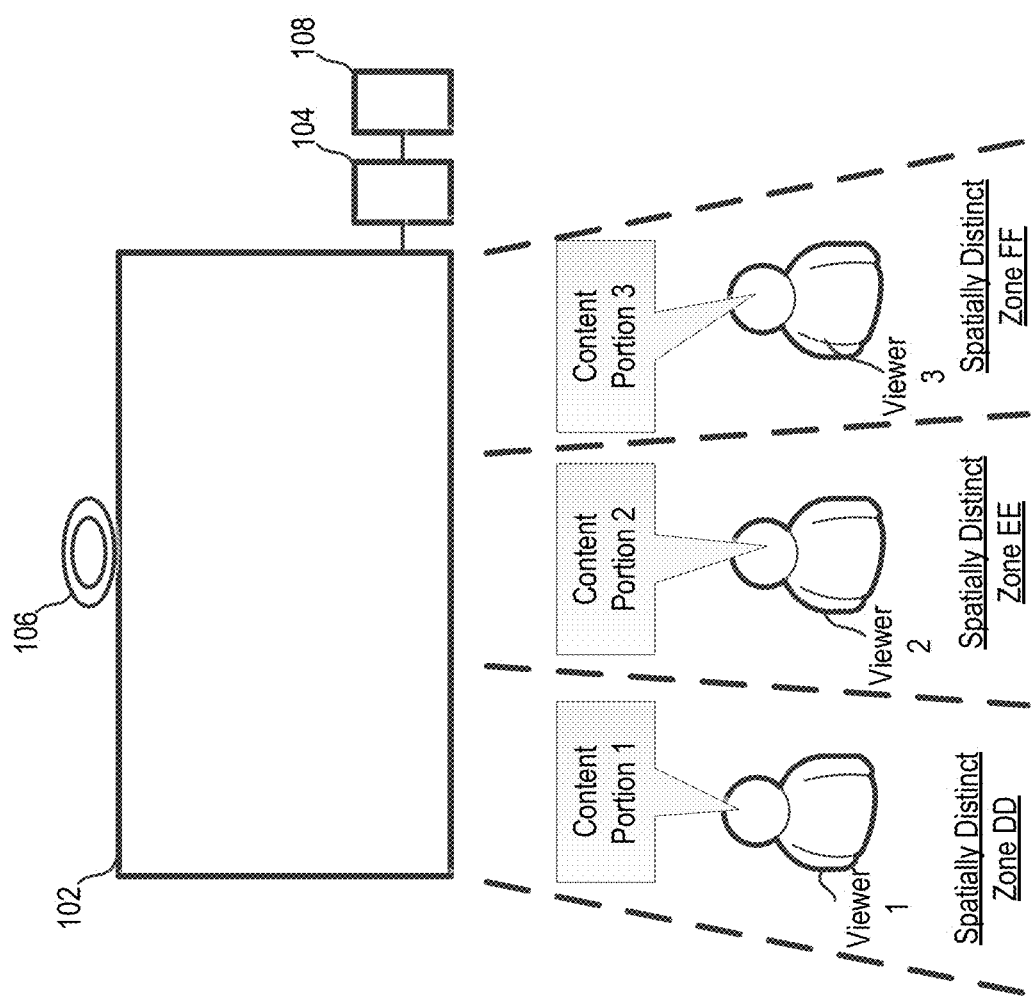
FIG. 8 depicts the system of FIG. 1 and an associated viewing region segregated into a third arrangement of spatially distinct zones for viewing differentiated content.

An example of what is discussed above is depicted in FIG. 8. In this embodiment, MVD 102 simultaneously shows three different content portions: content portion 1, content portion 2, and content portion 3 in respective spatially distinct zones DD, EE, and FF. To access a different content portion, a person may move (left or right) from one spatially distinct zone to another.

In order to enable allow each viewer to control the content without invading another viewer's personal space, multiple content portions can be repeated in regularly spaced intervals. For example, the zones in FIG. 8 can each be partitioned into three subzones. This enables each viewer to access content portion 1, content portion 2, and content portion 3 on MVD 102 by slightly shifting position around their location and without interfering with each other.

In situations in which a viewer changes position to access different subsets of content, there might be a region in which a viewer's left and right eye simultaneously see different content, resulting in a nauseating or otherwise unpleasant sensation. To reduce the likelihood of such an event, smoother transitions can be applied between adjacent content to make the transition less abrupt. For example, common cinematic transition techniques that may be applied include, but are not limited to, crossfading, fading to black, and/or fading to white. Such transitions can be applied spatially, so that a viewer experiences the transition when moving from one viewing location to another. To implement this, one or more transition viewing locations can be established between adjacent viewing locations where the transition sequence content is directed. An alternative technique is to utilize environmental objects, such as pillars, plants, statues, and/or other structures, as transition boundaries. This way, a viewer's left and right eyes may be prevented from simultaneously seeing the same portion of the display.

By subdividing content, MVD 102 can show a great amount and variety of verbiage, information, images, and media, only requiring viewers to shift position to cycle through all available versions of content.

In some other embodiments, arrangements other than a grid may be used for the layout of viewing locations, and these arrangements may be periodically or continually changed. The change can be occasioned, for example and without limitation, as a function of a change in the number or spacing of viewers, the behavior of viewers, the number of versions of content, the type of content, or the viewing environment. In some embodiments, the arrangement of viewing locations is linked to monitoring technologies, automated systems, timers, or controls operated either beforehand or in real-time. These are all by way of example to express the range and versatility with which viewing zones may be associated with a corresponding version of content to increase the amount and accessibility of content available on an MVD.

As an example, consider a shopping mall having a multi-view display in an area where visitors seek information or directions. Furthermore, assume that there are numerous restaurants in the mall, each of which would like to show their menu on the MVD, but there is not enough space to enable a mall visitor to see all the menus on the same display at the same time.

In some embodiments, the menu for each restaurant is composed to fill the entire MVD. Each menu is then assigned to a different spatially distinct zone (or viewing location or locations, as appropriate) within the sightlines of the MVD. By changing location relative to the MVD, visitors can view all the different menus, one menu at a time. All the menus can be simultaneously viewed, but only by different visitors occupying different zones (or viewing locations, as appropriate). For instance, a husband and wife standing side-by-side may simultaneously read different menus.

As a variation on the aforementioned embodiment, the menus may also be continuously rotated for any one zone, so a visitor can stand at one spot and eventually see all the menus, or change location to view menus cycling at a different speed, or order, or place in the order.

In some embodiments, it is desirable to show a variety of content on a display, wherein not all the content is compatible. One such example is that of opposing political candidates requesting to have their campaign message posted on the same display, or companies with competing products or services, etc. Using an MVD, the content can be separated so that each is simultaneously shown to a separate zone or zones, and will not be seen together. In some embodiments, the spatially distinct zones are designed so all persons moving by the display will have the opportunity to see all versions of content, but not in simultaneous juxtaposition with each other for any one viewer. This approach is often preferable to time-cycling content, because the viewer may choose to idle on a piece of content that they are interested in by simply standing in place. Such a system provides an implicit control mechanism for the viewer.

In another example, a billboard-size MVD is in view from a highway as well as a nearby elementary school. On the highway, automobiles see an ad for an item that is inappropriate for school children. Simultaneously, near the school, children see nothing on the MVD or, alternatively, a message that is appropriate for them.

There are many possible variations in the design and matching of viewing zones and content. The correlation between viewing locations and various content portions may be static, dynamic, or a combination of both. The ability to access different content portions can be based on small movements (c.a., intraocular distance as a practical minimum for lateral movements) or, of course, any combination of larger increments or distances. Movements to access different content portions can be vertical, horizontal, or any direction or combination of directions.

The layout of viewing zones and correlation with content may anticipate or respond to the movements and behaviors of viewers, individually and in aggregate. These design formulations enable the access of content to seem spontaneous, intuitive, organized, carefully planned, programmed, or controlled.

Access to content on an MVD can be driven by the viewer's height. For example, an MVD that provides directions to the restroom may differentiate between viewers in a wheelchair and other standing viewers based on height. A person standing so that their eyes are in an upper spatially distinct zone will see the directions to a non-wheelchair accessible restroom, while a person in a wheelchair such that their eyelevel is within a lower spatially distinct zone will see the directions to the wheelchair accessible restroom.

The content on conventional signs and displays may be viewable from areas where it is irrelevant, misleading, or not fully leveraged. In many cases, content would be more effective and efficient if it was designed specifically for separate zones or viewing locations within the sightlines of a display. This is achievable with multi-view displays because they can simultaneously show different content to different viewers based on the location of the viewer relative to the display.

For example, an MVD that serves as a menu board for a fast-food restaurant may be viewable from the entire restaurant, but the menu options shown may only be relevant to individuals placing an order. In some embodiments in accordance with the present teachings, the MVD shows different content portions that: (1) welcomes individuals into the restaurant, (2) announces an order is ready for pick-up, (3) entices diners to buy desert, (4) provides entertainment for diners and people waiting for an order, (5) identifies available seating, and (6) promotes specials. All content portions—including the menu—are simultaneously shown on the display, but only a single content portion can be viewed by any individual at any one moment, and that one content portion is selected based on the location of the individual. This enables content to be targeted and relevant for multiple locations.

Consider, for example, an individual that is standing directly in front of an MVD that, for that location, displays a menu (a first content portion) from which to order items. A person sitting at a table that is further from the MVD sees an indication, for example, that the table's order is ready for pickup (a second content portion).

Figure 9:
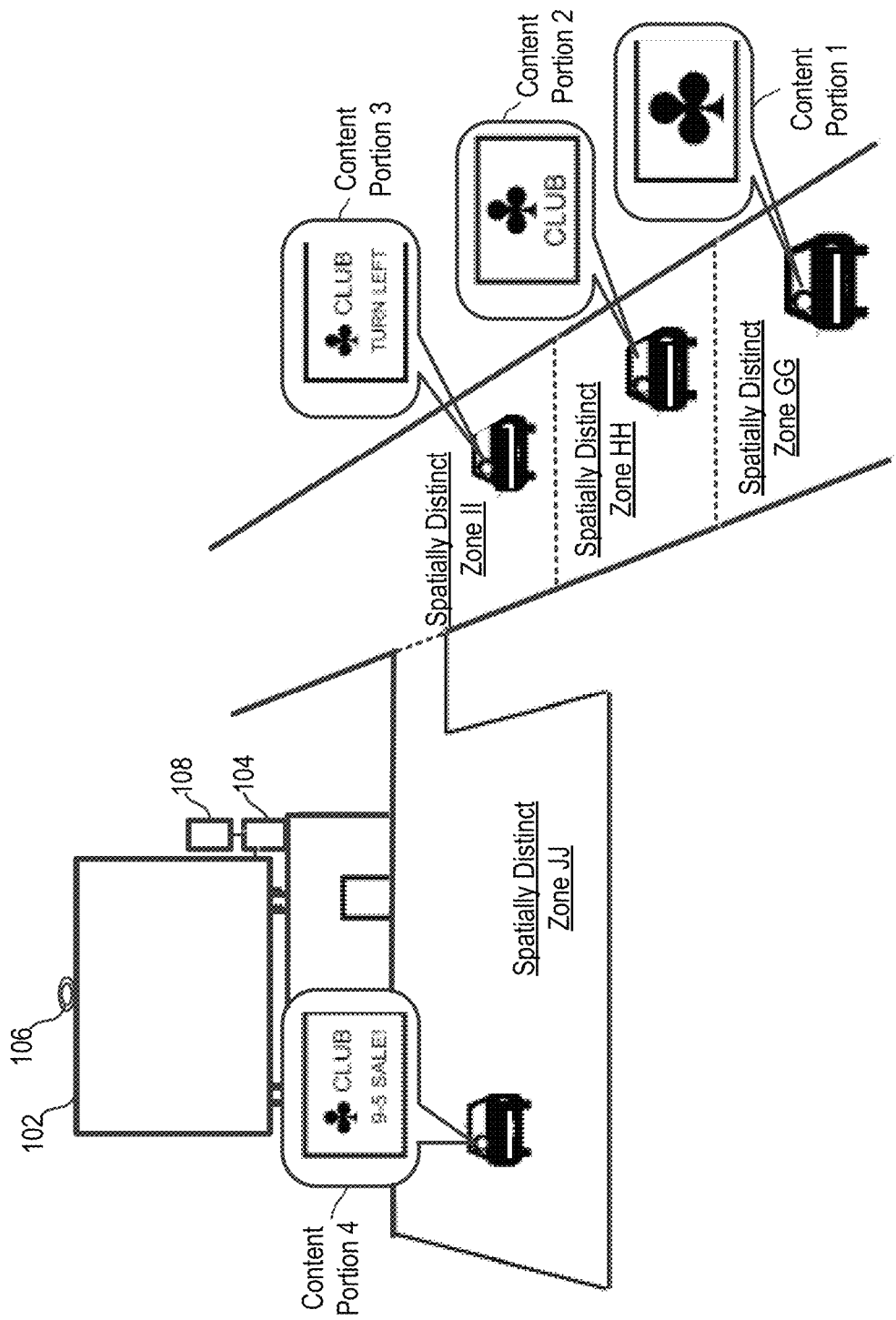
FIG. 9 depicts the system of FIG. 1 and an associated viewing region segregated into a fourth arrangement of spatially distinct zones for viewing differentiated content.

FIG. 9 depicts a billboard-size MVD 102 that is positioned over a building that is located next to a freeway. MVD 102 displays differentiated content, depicted as content portion 1, content portion 2, content portion 3, and content portion 4.

Content portion 1, viewable in spatially distinct zone GG, which is about a half-mile from the building, is the logo of a company in the building. Content portion 2, viewable in spatially distinct zone HH, which is about a quarter mile away from the building, is the name and logo of the company. Content portion 3, which is viewable in spatially distinct zone II, which is quite near to the building, provides directions to a driver wishing to visit the company. Content portion 4, viewable in spatially distinct zone JJ, which is the parking lot of the company, indicates special promotions and hours of operation to people.

In this manner, the display is simultaneously performing a range of functions tailored to the needs and interests of audiences based on their distance from the display. Thousands of drivers passing from a distance are given a branding message, while viewers who have sought out the venue as their destination are provided with the information they may need for navigating an off-ramp, finding parking, reaching the main or delivery entrances, knowing when the doors open, and benefiting from sales and specials.

In another embodiment, not depicted, an MVD in a retail setting entices viewers into and through a store, and then offers product information, sales, and specials specific to each department within view of the display. As a viewer approaches the MVD through various departments, the display promotes sale items specific to each department. Additionally, shoppers view content portions specifically tailored to their individual location in the store, such as, for example, near to product displays. Each location-specific content portion is simultaneously shown on the same MVD and each individual would only see content targeted to his or her location.

In yet a further example, an MVD, which is situated in a shopping mall, is viewable from the proximity of a number of shops and restaurants within the mall. As individuals pass near to various shops/restaurants, information specific to that particular business is displayed. More particularly, multiple individuals simultaneously see, on the same MVD, differentiated content that relates only to their specific surroundings.

In some further embodiments, it is desired to show sequential content when there is relative movement between viewers and one or more MVDs. For example, viewers may be moving past the display as a pedestrian, or by conveyances such as a bike, car, truck, bus, train, tram, subway, walkway, boat, ride vehicle, etc. Or the MVD itself may be moving relative to viewers by any of these or other conveyances, or even perhaps on a parade float or stadium vehicle.

In these cases, it is possible to simultaneously show multiple content portions on each display, so that when viewed from the furthest distance the initial content is visible, and each subsequent version of content appears in its designated order as the distance between viewer and display is decreased. The same may be achieved if the desire is to progress through the sequence as the distance increases, or even in cases where the relative position between a viewer and the display is a complicated dynamic that changes at a varying rate. In these examples, different content portions are simultaneously shown on the display, but the portion seen by any individual is specific to the spatial relationship between the individual and the display at any given time.

As an example, a parade float features a multi-view display that does not repeat its message to any one zone or group as it travels the parade route. Instead, distinctly different media (content portions) is simultaneously viewable to audiences depending on their distance from the float as it approaches, arrives, and departs. If the float has a special message or surprise when it arrives alongside each segment of the route, the message will not be shown to audiences at a greater distance than is desired so as not to spoil the surprise.

A vehicle driving around a sports field past each section of audience can achieve a similar effect. For example, consider a vehicle having an MVD mounted to its roof, which drives past an audience. The display shows three different content portions. Audience members in front of the vehicle see a message suggesting that they prepare to "cheer," while audience members currently beside the vehicle see a cue to "cheer now." Audience members behind the vehicle who have already cheered are "thanked" for cheering. As the vehicle drives by the stand, each member of the audience sees the three content portions in sequence, but the vehicle can cue a spontaneous reaction from audiences who will not be able to see the cueing message until it is alongside them.

Another example is an MVD version of the historic "Burma-Shave" signs, in which a single display offers a continuity of messages and images as individuals travel relative to the display. An illustration of this is a rhyming marketing message in which each stanza becomes visible as a viewer approaches the display. All the stanzas are simultaneously available on the display, but each individual stanza can only be seen from a designated zone that anticipates or tracks the movement of the individual so as to appear—and be read—in proper order.

Content does not need to be sequenced strictly based on distance between the viewer and the multi-view display. As long as the approximate path of the viewer relative to the display can be anticipated, the content can be sequenced by viewing zone.

Figure 10:
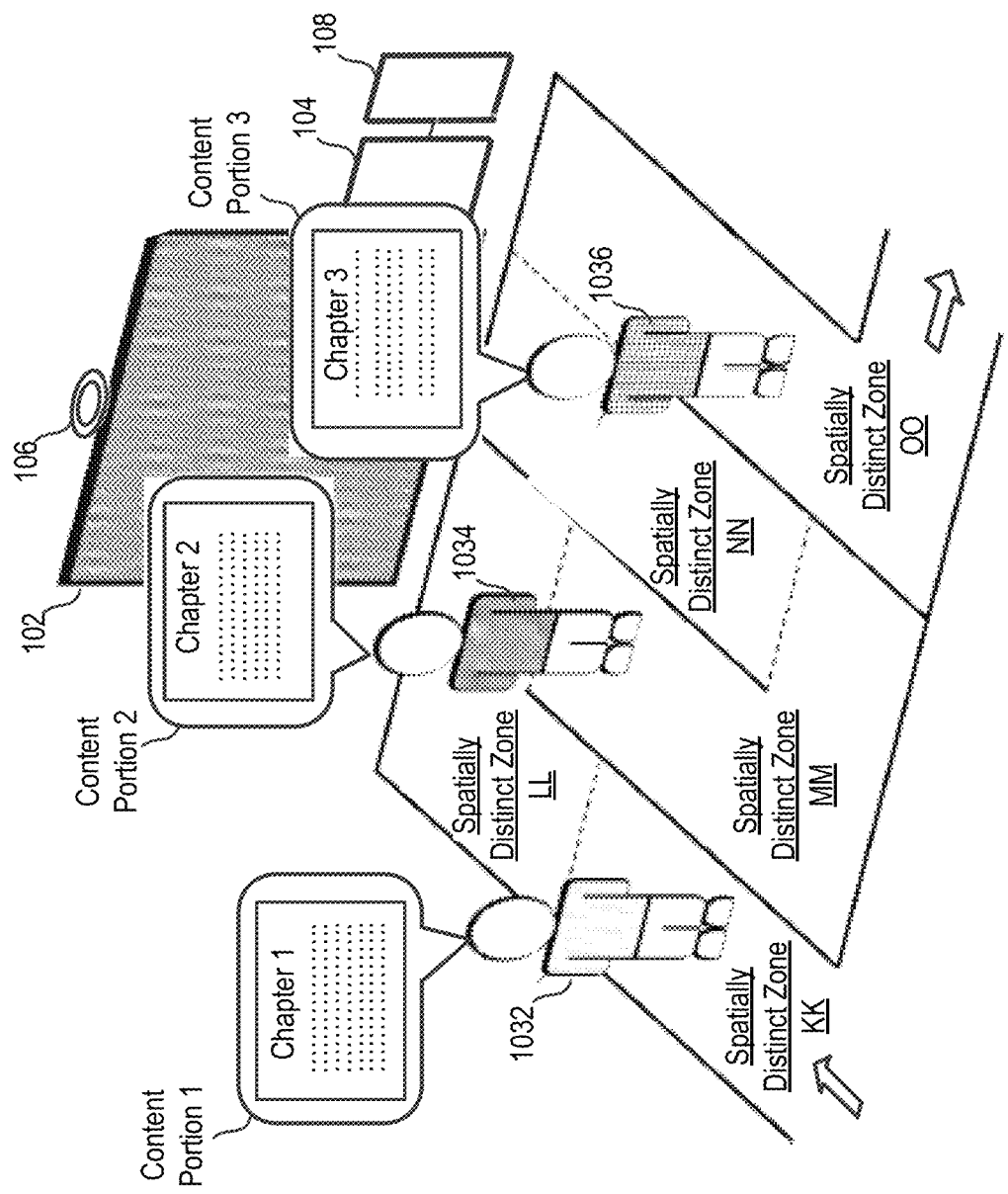
FIG. 10 depicts the system of FIG. 1 and an associated viewing region segregated into a fifth arrangement of spatially distinct zones for viewing differentiated content, wherein the content is sequenced as a function of a viewer's presence in a particular spatially distinct zone.

An example of the foregoing scenario is depicted in FIG. 10, which involves a theme park attraction queue. Guests waiting in a maze-like line all see the same MVD 102, but the sequential narrative viewable on the display progresses in its correct order for each individual guest 1032, 1034, and 1036 as they near the attraction. For example, guest 1032 in spatially distinct zone KK sees the first chapter of the narrative (content portion 1), while guest 1034 in spatially distinct zone MM sees the second chapter of the narrative (content portion 2). Simultaneously, guest 1036 in spatially distinct zone OO sees the third and final chapter of the narrative (content portion 3). In this case, the line may fold back and forth on itself, and guests may not consistently lessen their distance from the display. The messaging, however, is designed to be visible in sequence by zone, and not by distance from the display, so it will still be seen in its proper order.

In another example, guests 30-40 minutes from a ride will see the beginning of the narrative, guests with 20-30 minutes to wait will see the middle of the narrative, and guests within 20 minutes of riding will view the end of the story. All guests see their distinct portion of the story on the display at the same time that other guests are viewing their respective portions.

As a final example of presenting sequential content, the content may be designed to change in carefully calculated increments so it appears to be animated or in motion as a viewer moves relative to the MVD. In an example, multiple static images are simultaneously available for viewing, with each image viewable only from a designated zone or zones relative to the display. By changing location with respect to the display, at a consistent rate, viewers see the images as they would frames in a film, thereby creating the appearance of animated movement. A first vehicle, for example, in a first spatially distinct zone sees the first frame of the animation, while a second vehicle in a second spatially distinct zone sees the second frame of the animation. Similarly, a third and fourth vehicle in respective third and fourth zones simultaneously see the third and fourth frames of the animation. Each vehicle sees the full animation as it drives across all the viewing zones. The rate and path of each viewer's movement may be anticipated, and the images and viewing zones may be matched to achieve the correct sequence and appropriately timed, incremental movement of the image.

Signage and displays may be viewable from some locations that have partial blockage or blind spots, such as caused by architecture, structural elements, furnishings, landscaping, or other sightline issues. In such cases, content may be designed that compensates for blockage, with the blockage-adjusted content only shown to people viewing the multi-view display from affected areas.

In these cases, content can be recomposed and/or resized to only occupy portions of the MVD that are visible. Another technique is to animate the content elements, so over a period of time all content is eventually visible in non-blocked portions of the display. Yet another approach is to reduce the amount of content, so prioritized elements can be viewed in the reduced display space and there is no content in blocked areas.

Figure 11:
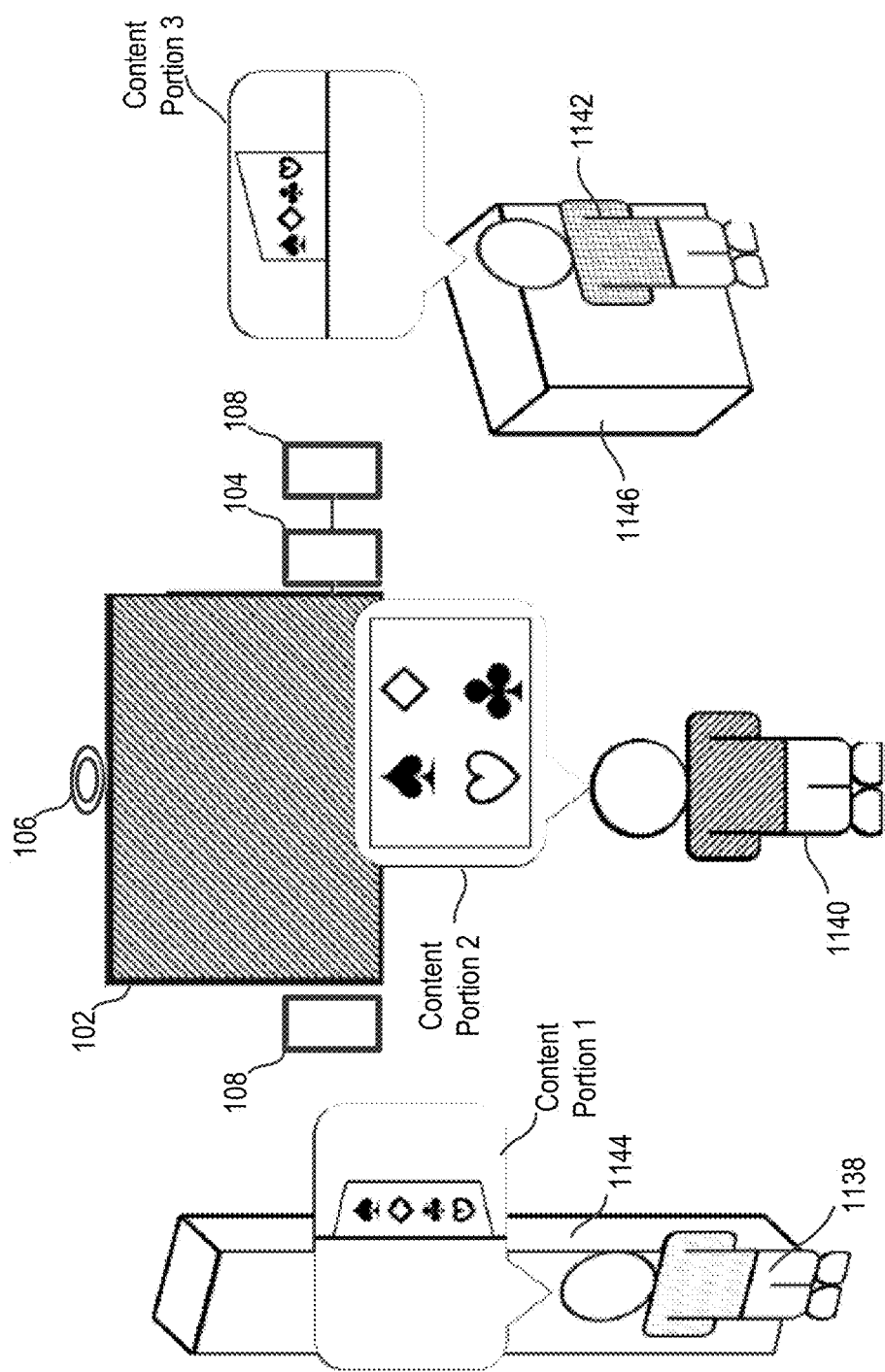
FIG. 11 depicts the system of FIG. 1 and a manner of presenting differentiated content to partially occluded viewing locations.

Some blockage scenarios are depicted in FIG. 11, wherein three viewers 1138, 1140, and 1142 are simultaneously viewing MVD 102. The view of person 1138 is partially obscured by tall vertical pillar 1144, the view of person 1140 is unobstructed, and the view of person 1142 is partially obscured by horizontal obstacle 1146. To compensate for the obstructions, content portion 1 for person 1138 is, in this embodiment, placed vertically in the portion of MVD 102 that is unobstructed by the pillar. Content portion 3 for person 1142 is placed horizontally in the portion of MVD 102 that is unobstructed by the obstacle. Content portion 2 for person 1140 can be expanded to fill the entire display since it is unobstructed. Standard image retargeting techniques, well known to those skilled in the art, can be employed.

There may be a variety of sight-line issues for a given MVD, each requiring a specific re-layout of content or other adjustment. Each redesigned version of the content is mapped to its corresponding zone or viewing location so that it would only be shown to people viewing therefrom.

Consider, for example, a store marquee implemented as an MVD in an indoor shopping center. Shoppers passing by the marquee might have their view partially obstructed by a column. In those areas, a different content portion would be shown that is adapted for the blockage.

When signage and displays are viewed from extreme angles—below, above, right, or left—their content can appear distorted. Multi-view displays offer the opportunity to design content that compensates for distortion in Trompe L'Oeil style, by elongating, foreshortening, bending, or otherwise manipulating content so that when viewed from an angle it has the illusion of being viewed straight on.

Figure 12:
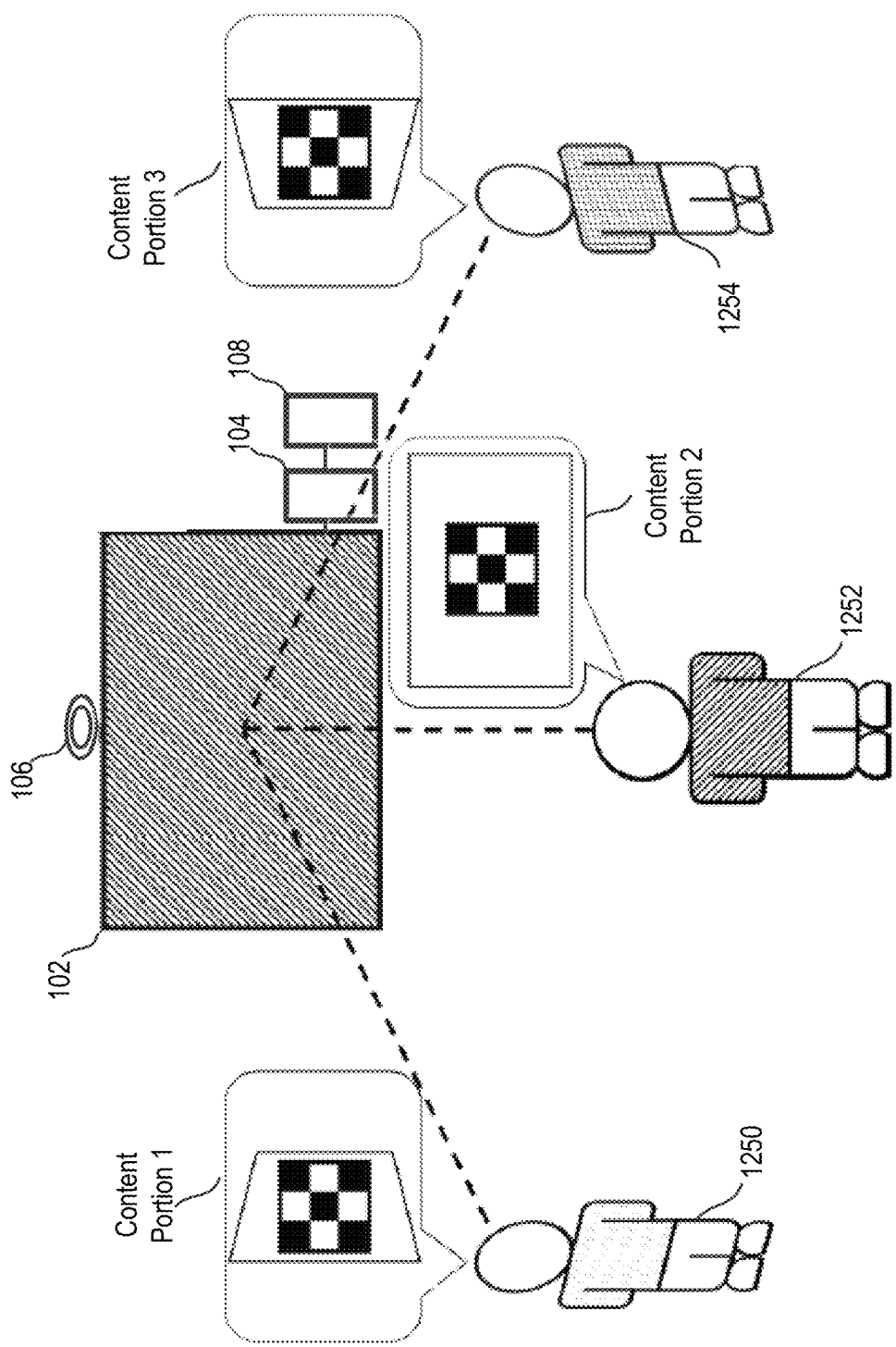
FIG. 12 depicts the system of FIG. 1 and a manner of presenting differentiated content that compensates for the distortion that arises due to an extreme viewing angle.

FIG. 12 depicts three viewers 1250, 1252, and 1254, each simultaneously peering at MVD 102. Although they are looking at the display from different angles, each viewer simultaneously sees the graphic on the display, identified as content portion 1, content portion 2, and content portion 3, to appear undistorted as if viewed straight on.

This can be accomplished by partitioning the viewing angles of MVD 102 into bins. For each viewing-angle bin, a set of transformation parameters are computed that alter the image to look approximately undistorted from the corresponding viewing angle. The transformation parameters are then applied to the image to be displayed for each viewing angle bin. Each altered image is then simultaneously shown on MVD 102 for that viewing angle bin.

It is to be understood that the disclosure teaches just one example of the illustrative embodiment and that many variations of the invention can easily be devised by those skilled in the art after reading this disclosure and that the scope of the present invention is to be determined by the following claims.

What is claimed:

1. A method, implemented by a processor, for simultaneously displaying, via a multi-view display, differentiated content to a plurality of spatially distinct viewing zones within a viewing region of the multi-view display, the method comprising:
- mathematically defining the spatially distinct viewing zones, wherein the mathematical definition of the spatially distinct viewing zones is arbitrary as not being dictated by display optics;
- assigning, to respective ones of the plurality of spatially distinct viewing zones, the differentiated content, wherein the differentiated content comprises a plurality of content portions differ in subject matter from one another, wherein the differentiated content is assigned without direct input from a viewer regarding content preference;
- estimating a location, in the viewing region, for each of at least some of plural landing spots of beamlets to be projected by respective ones of multi-view pixels of the multi-view display, wherein each landing spot is a point of intersection between one of said beamlets and a surface located in one of the spatially distinct viewing zones;
- determining in which of the respective ones of the spatially distinct zones the locations of the landing spots reside; and
- driving the beamlets associated with the landing spots to cause an appropriate content portion, based on the assignment thereof, to be viewable at respective ones of said locations of the landing spots, wherein the only beamlets driven from the multi-view pixels are those having a landing spot in the viewing region.

2. The method of claim 1 wherein estimating a location further comprises obtaining a three-dimensional geometrical characterization of the viewing region.

3. The method of claim 1 wherein estimating a location further comprises obtaining a depth map of the viewing region.

4. The method of claim 1 wherein assigning each content portion with a respective spatially distinct zone is based on contextual appropriateness therewith, wherein contextual appropriateness refers to a relationship between a characteristic of the spatially distinct zone and a characteristic of the subject matter of the content portion.

5. The method of claim 4 wherein contextual appropriateness includes a consideration of one or more contexts selected from the group consisting of: a distance of a spatially distinct region to the multi-view display, an amount of information to be presented, an extent to which a view of the multi-view display is obscured, and a sequencing of content portions.

6. The method of claim 1 wherein:
(a) at least some of the landing spots share the same viewing angle as one another with respect to the respective ones of the multi-view pixels;
(b) a first portion of said some landing spots are at a first distance from the respective ones of the multi-view pixels;
(c) a second portion of said some landing spots represent intersections of beamlets with a viewer, and are at a second distance from the respective ones of the multi-view pixels;
(d) the second distance is greater than the first distance, and the viewer's view of the multi-view display is partially occluded,
wherein driving the beamlets associated with the second portion of landing spots causes the appropriate content portion to be viewable to the viewer, notwithstanding the viewer's partially occluded view.

7. The method of claim 1 and further comprising associating, with each spatially distinct zone, an indicium that indicates, to a viewer, subject matter associated with the content portion viewable in the associated spatially distinct zone.

8. The method of claim 7 wherein the indicium further indicates a location at which to view the content portion in the associated spatially distinct zone.

9. The method of claim 1 and further comprising visually communicating instructions to viewers that the plurality of content portions are available for viewing and communicating an indication of the subject matter thereof.

10. The method of claim 9 and further wherein the instructions are interactive, being controllable by the viewers.

11. The method of claim 1 and further comprising:
- determining, for at least some of the landing spots, whether images composing a content portion being conveyed by the beamlets are distorted as a consequence of viewing angle;
- modifying the content portion based on the determination so that when viewed from the viewing angle, the content portion appears as if same is being viewed straight on and undistorted; and
- displaying the modified content portion via the multi-view display.

12. The method of claim 1 wherein, for images composing a content portion being conveyed by beamlets, the method further comprises:
- determining a distance of the images from the multi-view display; and
- altering one or more characteristics of the images as a function of the respective distances from the multi-view display, wherein the altered characteristics are selected from the group consisting of image size, contrast, font, style, and color.

13. The method of claim 1 wherein, for images composing a content portion being conveyed by beamlets, the method further comprises:
- determining a distance of the images from the multi-view display; and
- altering an amount of information conveyed by the images as a function of the respective distances from the multi-view display, wherein the altered amount of information conveyed decreases as distance increases.

14. The method of claim 1 and further comprising:
- determining, for at least some of the landing spots, whether a viewer's sight line to images composing a content portion being conveyed by the beamlets is partially obstructed;
- modifying the content portion based on the determination to compensate for partial obstruction by retargeting the content portion; and
- displaying the retargeted content portion via the multi-view display.

15. The method of claim 14 wherein retargeting the content portion further comprises altering at least one of a size or an orientation of the images.

16. The method of claim 1 wherein displaying, to at least some of the spatially distinct zones, the content portion associated therewith further comprises displaying the content portions in a sequence, wherein the sequence is defined by an arrangement of the spatially distinct zones.

17. The method of claim 1 wherein defining a plurality of spatially distinct zones further comprises segregating the viewing region in a manner selected from the group consisting of: vertically, based on distance from the multi-view display, and based on angular orientation with respect to an axis normal to a viewing surface of the multi-view display.

18. A system for simultaneously displaying differentiated content to a plurality of spatially distinct viewing zones within a viewing region of a multi-view display, wherein the differentiated content includes a plurality of content portions that differ in subject matter from one another, wherein the system comprises:

the multi-view display, wherein the multi-view display comprises a plurality of multi-view pixels;

a sensing system, wherein the sensing system obtains a characterization of a three-dimensional geometry of the viewing region; and a controller that:

(a) mathematically defines the plurality of spatially distinct viewing zones within the viewing region, wherein the mathematical definition of the spatially distinct viewing zones is arbitrary as not being dictated by display optics;

(b) assigns, to respective ones of the plurality of spatially distinct viewing zones, the differentiated content, wherein the differentiated content is assigned without direct input from a viewer regarding content preference;

(c) using the characterization, estimates a location, in the viewing region, for plural landing spots of beamlets to be projected by respective ones of multi-view pixels of the multi-view display, wherein each landing spot is a point of intersection between one of said beamlets and a surface located in one of the spatially distinct viewing zones;

(d) determines in which of the respective ones of the spatially distinct zones said locations of the plural landing spots reside;

(e) sets, based on the determined spatially distinct zones and the associated content assignments, the color and intensity of the beamlets to be projected; and (f) projects the beamlets, wherein the only beamlets projected from the multi-view pixels are those having a landing spot in the viewing region.

\* \* \* \* \*